(12) United States Patent
Hirota

(10) Patent No.: US 11,671,543 B2
(45) Date of Patent: Jun. 6, 2023

(54) SETTING SYSTEM FOR SETTING SCREEN IN ELECTRONIC DEVICE CAPABLE OF CUSTOMIZING AN OPERATION SCREEN

(71) Applicant: KYOCERA Document Solutions Inc., Osaka (JP)

(72) Inventor: Masato Hirota, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/518,726

(22) Filed: Nov. 4, 2021

(65) Prior Publication Data

US 2022/0150370 A1 May 12, 2022

(30) Foreign Application Priority Data

Nov. 11, 2020 (JP) .............................. JP2020-188118
Nov. 11, 2020 (JP) .............................. JP2020-188119

(51) Int. Cl.
*H04N 1/00* (2006.01)
*G06F 3/0484* (2022.01)
*G06F 3/12* (2006.01)

(52) U.S. Cl.
CPC ....... *H04N 1/00514* (2013.01); *G06F 3/0484* (2013.01); *G06F 3/123* (2013.01); *G06F 3/1204* (2013.01); *H04N 1/00511* (2013.01); *G06F 3/1292* (2013.01)

(58) Field of Classification Search
CPC ............ H04N 1/00514; H04N 1/00511; G06F 3/0484; G06F 3/1204; G06F 3/123
USPC ......................................................... 358/1.15
See application file for complete search history.

(56) References Cited

U.S. PATENT DOCUMENTS

| 2015/0319319 | A1* | 11/2015 | Maeda ..................... G06T 11/60 358/1.13 |
| 2016/0072972 | A1* | 3/2016 | Akuzawa ........... H04N 1/00506 358/1.13 |
| 2017/0187904 | A1* | 6/2017 | Sato ........................ G06T 13/80 |
| 2017/0208181 | A1* | 7/2017 | Kim ..................... H04N 1/0023 |

FOREIGN PATENT DOCUMENTS

JP        2012-124605        6/2012

* cited by examiner

*Primary Examiner* — Allen H Nguyen
(74) *Attorney, Agent, or Firm* — Lex IP Meister, PLLC

(57) ABSTRACT

A setting system for setting an operation screen in an electronic device has layout management information that manages a layout of the operation screen of the electronic device in association with information on the electronic device, and, according to a request for the layout by the electronic device, specifies the layout to be transmitted to the electronic device on the basis of the layout management information and transmits the layout to the electronic device.

7 Claims, 28 Drawing Sheets

74e LAYOUT MANAGEMENT INFORMATION

| IDENTIFICATION INFORMATION | LAYOUT |
|---|---|
| Device a | LAYOUT a |
| Device b | LAYOUT b |
| Device c | LAYOUT a |
| Device d | LAYOUT c |
| Device e | LAYOUT b |
| . . . | . . . |

FIG. 10

| PRODUCT NAME | HOST NAME | IP ADDRESS | SERIAL ID | MAC ADDRESS | INSTALLED VERSION |
|---|---|---|---|---|---|
| TASKalfa 6053ci | DEVICE001 | 10.183.63.30 | ZDRX000001 | 08002774EE13 | 1.0 |
| TASKalfa 5053ci | DEVICE002 | 10.183.63.31 | ZDRX000002 | 0800027F02386 | 1.2 |
| TASKalfa 4053ci | DEVICE003 | 10.183.63.32 | ZDRX000003 | 0800027B9F436 | 2.0 |
| TASKalfa 3553ci | DEVICE004 | 10.183.63.33 | ZDRX000004 | 0800275247D7 | 2.0 |
| TASKalfa 3253ci | DEVICE005 | 10.183.63.34 | ZDRX000005 | 0800278AFE29 | NONE |
| ... | ... | ... | ... | ... | ... |

FIG. 20

74g USER LIST

| USER | GROUP |
|------|-------|
| User a | — |
| User b | Group a |
| User c | Group b |
| User d | Group b |
| User e | Group c |
| ⋅<br>⋅<br>⋅ | ⋅<br>⋅<br>⋅ |

FIG. 21

74e LAYOUT MANAGEMENT INFORMATION

| IDENTIFICATION INFORMATION | TYPE | LAYOUT |
|---|---|---|
| Device a | Device | LAYOUT a |
| Device b | Device | LAYOUT b |
| Device c | Device | LAYOUT c |
| ⋮ | ⋮ | ⋮ |
| Group a | Group | LAYOUT d |
| Group b | Group | LAYOUT e |
| Group c | Group | LAYOUT f |
| ⋮ | ⋮ | ⋮ |
| User a | User | — |
| User b | User | LAYOUT g |
| User c | User | LAYOUT h |
| User d | User | LAYOUT i |
| User e | User | LAYOUT j |
| ⋮ | ⋮ | ⋮ |

74h LAYOUT DISPLAY CONDITION INFORMATION

| DISPLAY METHOD | LAYOUT ALLOWED TO BE DISPLAYED | DISPLAY PRIORITY |
|---|---|---|
| USER SELECTION | GROUP LAYOUT | USER LAYOUT |
|  | USER LAYOUT | GROUP LAYOUT |
|  |  | DEVICE LAYOUT |

SETTING SYSTEM FOR SETTING SCREEN IN ELECTRONIC DEVICE CAPABLE OF CUSTOMIZING AN OPERATION SCREEN

INCORPORATION BY REFERENCE

This application is based upon, and claims the benefit of priority from, corresponding Japanese Patent Application No. 2020-188118 and Japanese Patent Application No. 2020-188119 filed in the Japan Patent Office on Nov. 11, 2020, the entire contents of which are incorporated herein by reference.

BACKGROUND

Field of the Invention

The present disclosure relates to a setting system for setting an operation screen in an electronic device, a computer-readable non-temporary storage medium storing a setting program, and an information processing system.

Description of Related Art

As a conventional electronic device, an image forming device capable of customizing an operation screen has been known.

SUMMARY

A setting system in the present disclosure is a setting system for setting an operation screen in an electronic device, has layout management information that manages a layout of the operation screen of the electronic device in association with information on the electronic device, and, according to a request for the layout by the electronic device, specifies the layout to be transmitted to the electronic device on the basis of the layout management information and transmits the layout to the electronic device.

A computer-readable non-temporary storage medium in the present disclosure is a computer-readable non-temporary storage medium storing a setting program for setting an operation screen in an electronic device. The setting program causes a computer to: hold, in memory, layout management information that manages a layout of the operation screen of the electronic device in association with information on the electronic device; and, according to a request for the layout by the electronic device, specify the layout to be transmitted to the electronic device on the basis of the layout management information and transmit the layout to the electronic device.

An information processing system in the present disclosure includes: an electronic device; and a setting system that sets an operation screen in the electronic device. The setting system has layout management information that manages a layout of the operation screen of the electronic device in association with information on the electronic device. The electronic device requests the setting system for the layout. According to the request for the layout by the electronic device, the setting system specifies the layout to be transmitted to the electronic device on the basis of the layout management information, and transmits the layout to the electronic device. The electronic device displays the operation screen corresponding to the layout received from the setting system.

These and other features, aspects and advantages of the invention will become better understood with reference to the following drawings, description and claims.

BRIEF DESCRIPTION OF THE DRAWINGS

FIG. 10 is a table illustrating an example of the device list that is displayed on the user terminal illustrated in FIG. 1;

FIG. 20 is a table illustrating an example of a user list illustrated in FIG. 18;

FIG. 21 is a table illustrating an example of the layout management information illustrated in FIG. 18;

DETAILED DESCRIPTION

A description will hereinafter be made on an embodiment of the present disclosure with reference to the drawings.

A description will firstly be made on a configuration of an information processing system according to the embodiment of the present disclosure.

Figure 1:
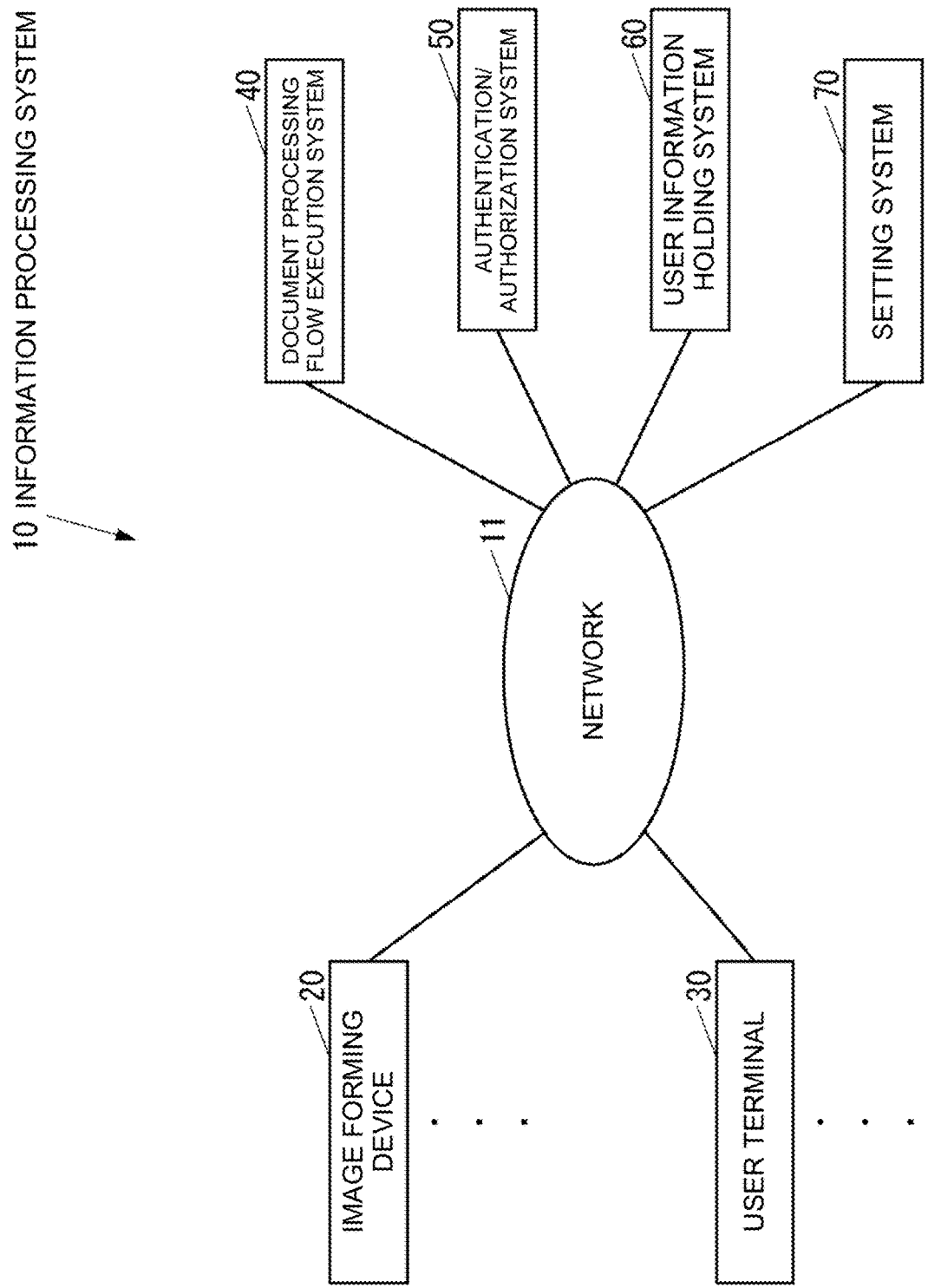
FIG. 1 is a block diagram of an information processing system according to an embodiment of the present disclosure.

FIG. 1 is a block diagram of an information processing system 10 according to the present embodiment.

As illustrated in FIG. 1, the information processing system 10 includes an image forming device 20 as an electronic device. In addition to the image forming device 20, the information processing system 10 may include at least one image forming device that has the same configuration as the image forming device 20. The image forming device in the information processing system 10 is constructed of, for example, an MFP, a printer-dedicated machine, or the like.

The information processing system 10 includes a user terminal 30 that is used by a user. In addition to the user terminal 30, the information processing system 10 may include at least one user terminal that has the same configuration as the user terminal 30. The user terminal in the information processing system 10 is constructed of, for example, a computer such as a personal computer (PC).

The information processing system 10 includes a document processing flow execution system 40 that executes a document processing flow as a workflow of document processing. The document processing flow execution system 40 may be constructed of a single computer or may be constructed of plural computers. The document processing flow that is executed by the document processing flow execution system 40 includes: an input stage in which a document is input; a document processing stage in which various types of processing are executed on the document that has been input in the input stage; and an output stage in which a result of the processing in the document processing stage is output. Various methods are available as a method for inputting the document in the input stage and include, for example: a method for inputting, as the document, an image that is read from a manuscript by a scanner of the image forming device; a method for inputting the document that is arranged in a specific folder; and a method for inputting the document that is attached to a received e-mail. As the processing on the document in the document processing stage, the various types of the processing are available and include, for example: optical character recognition (OCR) processing to generate a text from the image as the document; Zone OCR processing to generating a text from a part of the image as the document; processing to execute, on the image as the document, specific image processing such as tilt correction, dot removal, or noise removal; and processing to convert a format of the image as the document. As a method for outputting the result of the processing in the output stage, various methods are available and include, for example: a method for outputting the result of the processing to the specific folder; and a method for transmitting the result of the processing to a specific destination by e-mail. The document processing flow execution system 40 can save the plural document processing flows.

The information processing system 10 can include an authentication/authorization system 50 that authenticates and authorizes the user of the information processing system 10. The authentication/authorization system 50 may be constructed of a single computer or may be constructed of plural computers. The authentication/authorization system 50 manages, per user, restriction on use of various functions of the image forming device, and can provide the image forming device and the document processing flow execution system 40 with authorization information that indicates the restriction on the use of the various functions of the image forming device by the authenticated user, that is, the user who has logged in to the image forming device. For example, the authentication/authorization system 50 can spool print data that is transmitted from the user terminal, and can output the spooled print data to any of the image forming devices. The authentication/authorization system 50 can also manage use of the image forming device by the user of the information processing system 10. The authentication/authorization system 50 can register an integrated circuit (IC) card ID per user.

The information processing system 10 can include a user information holding system 60 that holds information on the user of the information processing system 10. The user information holding system 60 may be constructed of a single computer or may be constructed of plural computers. The user information holding system 60 can also hold information used in a system that is neither the document processing flow execution system 40 nor the authentication/authorization system 50.

The information processing system 10 can include a setting system 70 that sets an operation screen in the image forming device. The setting system 70 may be constructed of a single computer or may be constructed of plural computers.

The image forming device in the information processing system 10, the user terminal in the information processing system 10, the document processing flow execution system 40, the authentication/authorization system 50, the user information holding system 60, and the setting system 70 are communicably connectable via a network 11 such as a local area network (LAN).

Figure 2:
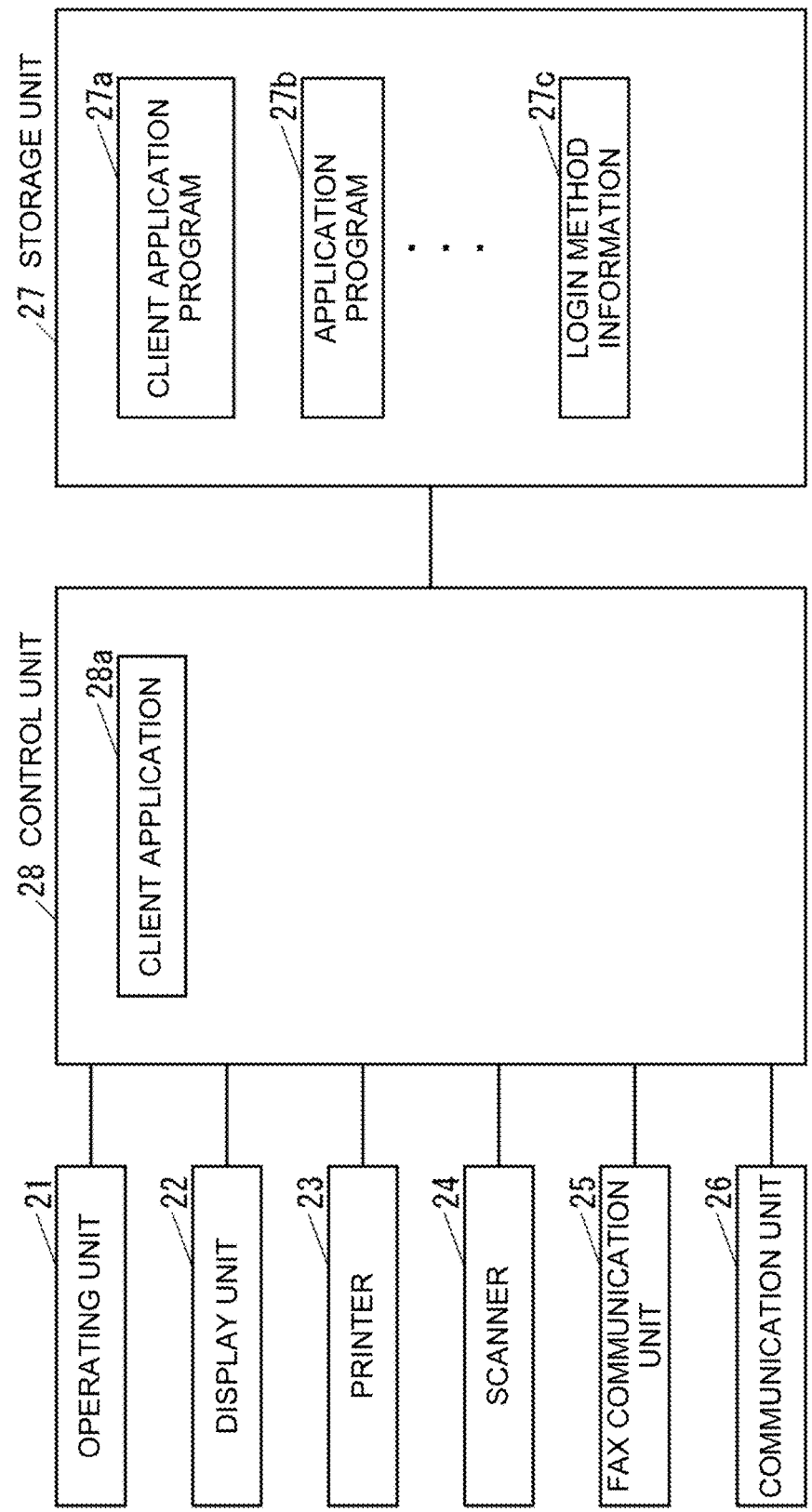
FIG. 2 is a block diagram of an image forming device in FIG. 1 that is constructed of a multifunction peripheral (MFP)

FIG. 2 is a block diagram of the image forming device 20 that is constructed of the MFP.

As illustrated in FIG. 2, the image forming device 20 is a computer that includes: an operating unit 21 as an input device such as a button to which various operations are input; a display unit 22 as a display device such as a liquid crystal display (LCD) that displays various types of information; a printer 23 as a printing device that prints an image on a recording medium such as paper; a scanner 24 as a scanning device that scans an image from a manuscript; a fax communication unit 25 as a fax device that performs fax communication with an external fax machine (not illustrated) via a communication line such as a public telephone line; a communication unit 26 as a communication device that communicates with an external device via the network such as the LAN or the Internet or directly by wire or wirelessly without interposing the network; a storage unit 27 as a non-volatile storage device, such as semiconductor memory or a hard disk drive (HDD), that stores various types of information; and a control unit 28 that controls the entire image forming device 20.

The storage unit 27 can store a client application program 27a as an application program for providing the user with functions of the image forming device 20, the document processing flow execution system 40 (see FIG. 1), and the authentication/authorization system 50 (see FIG. 1). For example, the client application program 27a may be installed in the image forming device 20 in a manufacturing stage of the image forming device 20, may be additionally installed in the image forming device 20 from an external storage medium such as Universal Serial Bus (USB) memory, or may be additionally installed in the image forming device 20 on the network.

The storage unit 27 can store an application program 27b that differs from the client application program 27a. The storage unit 27 can store at least one application program, which differs from the client application program 27a, in addition to the application program 27b.

As the application program that is installed in the image forming device 20, only one application program can be installed in the image forming device 20. Examples of such an application program are: an extensible authentication application program that is run first to display an authentication screen on the display unit 22 at the time when the image forming device 20 is activated in the case where the extensible authentication application program is installed; and an extensible application program as the application program other than the extensible authentication application program. The client application program 27a is the extensible authentication application program.

The storage unit 27 can store login method information 27c that indicates a login method on the authentication screen of the image forming device 20. The login method information 27c indicates any of a login method by using a combination of a user name and a password, a login method by using a PIN code, a login method by using the IC card ID, and a method in which these methods are combined.

For example, the control unit 28 includes: a central processing unit (CPU); read only memory (ROM) that stores a program and various types of data; and random access memory (RAM) as a volatile storage device that is used as a work area of the CPU in the control unit 28. The CPU of the control unit 28 runs a program that is stored in the storage unit 27 or in the ROM of the control unit 28.

The control unit 28 runs the client application program 27a and thereby implements a client application 28a. The client application 28a can restrict use of the various functions of the image forming device 20 according to the authorization information acquired from the authentication/authorization system 50. The various functions of the image forming device 20 include: "SCAN" as scanning of the image from the manuscript by the scanner 24; "PRINT OUTPUT" to print various images, such as the image based on the print data received via the communication unit 26, on the recording medium by the printer 23; "COPY" to print the image, which is scanned from the manuscript by the scanner 24, on the recording medium by the printer 23; "FAX TRANSMISSION" to transmit the image, which is scanned from the manuscript by the scanner 24, through the fax communication by the fax communication unit 25; "SCAN TRANSMISSION" to transmit the image, which is scanned from the manuscript by the scanner 24, by the communication unit 26; and the like.

Figure 3:
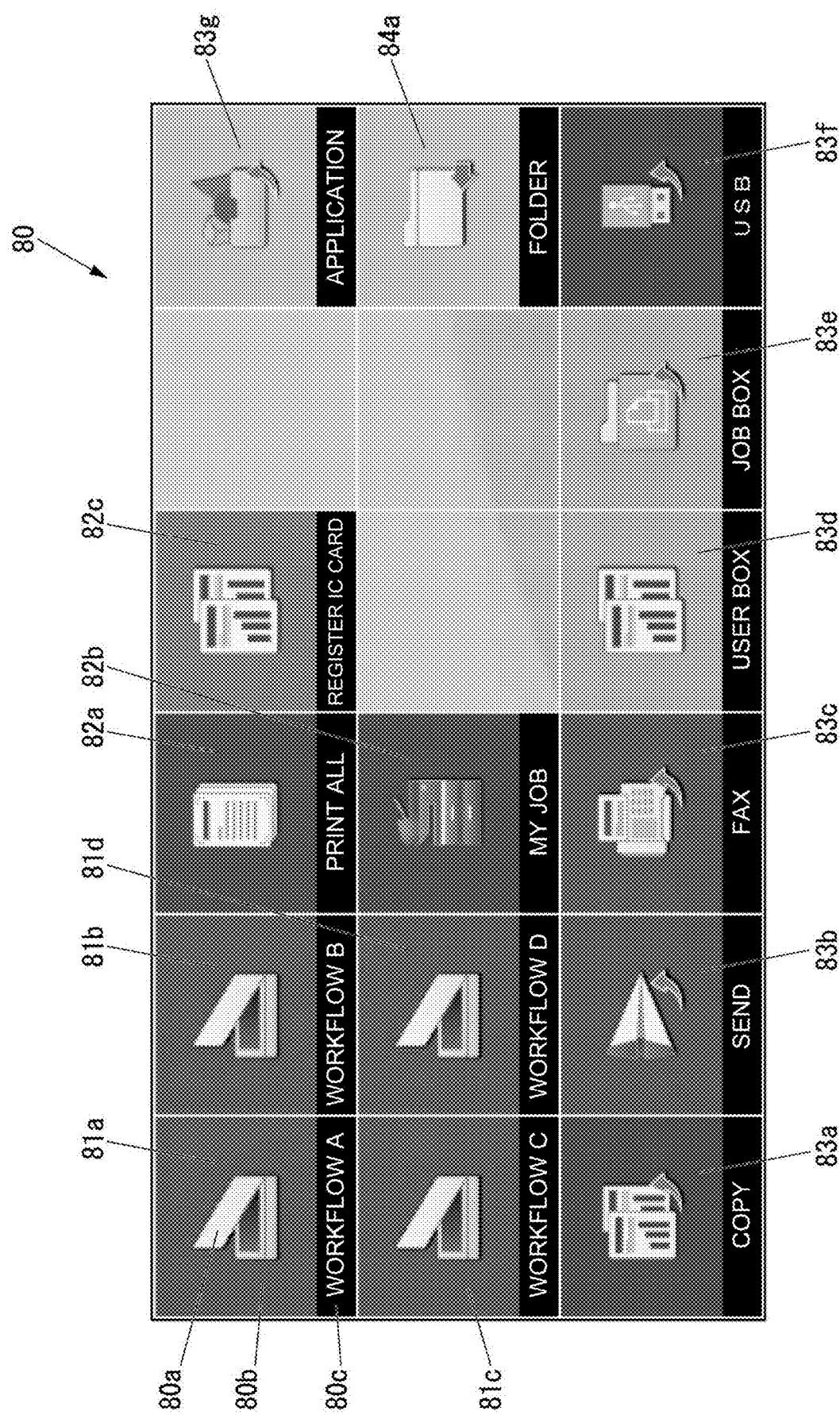
FIG. 3 is a view illustrating an example of an operation screen that is displayed on a display unit by a client application illustrated in FIG. 2.

FIG. 3 is a view illustrating an example of an operation screen 80 that is displayed on the display unit 22 (see FIG. 2) by the client application 28a (see FIG. 2).

In the operation screen 80 illustrated in FIG. 3, buttons associated with the functions of the image forming device 20 (see FIG. 1), the document processing flow execution system 40 (see FIG. 1), and the authentication/authorization system 50 (see FIG. 1), and the like are arranged. When any of the buttons arranged in the operation screen 80 is tapped, the client application 28a can use the function and the like associated with this button. Each of the buttons arranged in the operation screen 80 includes an icon image 80a, a background 80b of the icon image 80a, and a character string 80c arranged below the icon image 80a.

Examples of the buttons arranged in the operation screen 80 are: a "WORKFLOW A" button 81a as a "WORKFLOW" button for executing a document processing flow A as a specific document processing flow that is saved in the document processing flow execution system 40; a "WORKFLOW B" button 81b as a "WORKFLOW" button for executing a document processing flow B as a specific document processing flow that is saved in the document processing flow execution system 40; a "WORKFLOW C" button 81c as a "WORKFLOW" button for executing a document processing flow C as a specific document processing flow that is saved in the document processing flow execution system 40; and a "WORKFLOW D" button 81d as a "WORKFLOW" button for executing a document processing flow D as a specific document processing flow that is saved in the document processing flow execution system 40. The "WORKFLOW A" button 81a, the "WORKFLOW B" button 81b, the "WORKFLOW C" button 81c, and the "WORKFLOW D" button 81d are the buttons, with each of which the function of the document processing flow execution system 40 is associated.

Examples of the buttons arranged in the operation screen 80 are: a "PRINT ALL" button 82a for executing, by the printer 23, printing based on all the print data that is spooled in the authentication/authorization system 50 and that belongs to the user in a login state to the image forming device 20; a "MY JOB" button 82b for executing, by the printer 23, printing based on the print data that is spooled in the authentication/authorization system 50 and that is selected each time by the user from the print data of the user in the login state to the image forming device 20; and an "IC CARD REGISTRATION" button 82c for registering, in the authentication/authorization system 50, the IC card ID of the user in the login state to the image forming device 20. The "PRINT ALL" button 82a, the "MY JOB" button 82b, and the "IC CARD REGISTRATION" button 82c are the buttons, with each of which the function of the authentication/authorization system 50 is associated.

Examples of the buttons arranged in the operation screen 80 are: a "COPY" button 83a for copying in settings that correspond to values specified by the user each time; a "SEND" button 83b for scanning and sending in settings that correspond to values specified by the user each time; a "FAX" button 83c for executing fax transmission in settings that correspond to values specified by the user each time; a "USER BOX" button 83d for saving the image scanned from the manuscript by the scanner 24 in a specific area of the storage unit 27 and for printing, by the printer 23, an image saved in this area; a "JOB BOX" button 83e for saving data received from an external electronic device, such as a PC, in a specific area of the storage unit 27 and for printing based on the data saved in this area; a "USB" button 83f for saving the image scanned from the manuscript by the scanner 24 in the USB memory connected to the image forming device 20 and for printing based on the data saved in the USB memory connected to the image forming device 20; and an "APPLICATION" button 83g for running the specific application program, which is installed in the image forming device 20, other than the client application program 27a. The "COPY" button 83a, the "SEND" button 83b, the "FAX" button 83c, the "USER BOX" button 83d, the "JOB BOX" button 83e, the "USB" button 83f, and the "APPLICATION" button 83g are the buttons, with each of which the function of the image forming device 20 is associated.

In addition to the "COPY" button 83a, the "SEND" button 83b, the "FAX" button 83c, the "USER BOX" button 83d, the "JOB BOX" button 83e, the "USB" button 83f, and the "APPLICATION" button 83g, examples of the buttons, with each of which the function of the image forming device 20 is associated, include: a "SCAN" button for scanning in settings that correspond to values specified by the user each time; a "QUICK COPY" button for immediate copying in settings that correspond to values specified in advance; a "QUICK SCAN" button for immediate scanning in settings that correspond to values specified in advance; and a "QUICK FAX" button for immediate fax transmission in settings that correspond to values specified in advance.

An example of the button that is arranged in the operation screen 80 is a "FOLDER" button 84a for shifting to the operation screen in one level lower than the operation screen 80. Similar to the operation screen 80, in the operation screen, to which the operation screen 80 is shifted when the "FOLDER" button 84a is tapped, a button, with which the function of at least one of the image forming device 20, the document processing flow execution system 40, and the authentication/authorization system 50 is associated, may be arranged.

Figure 4:
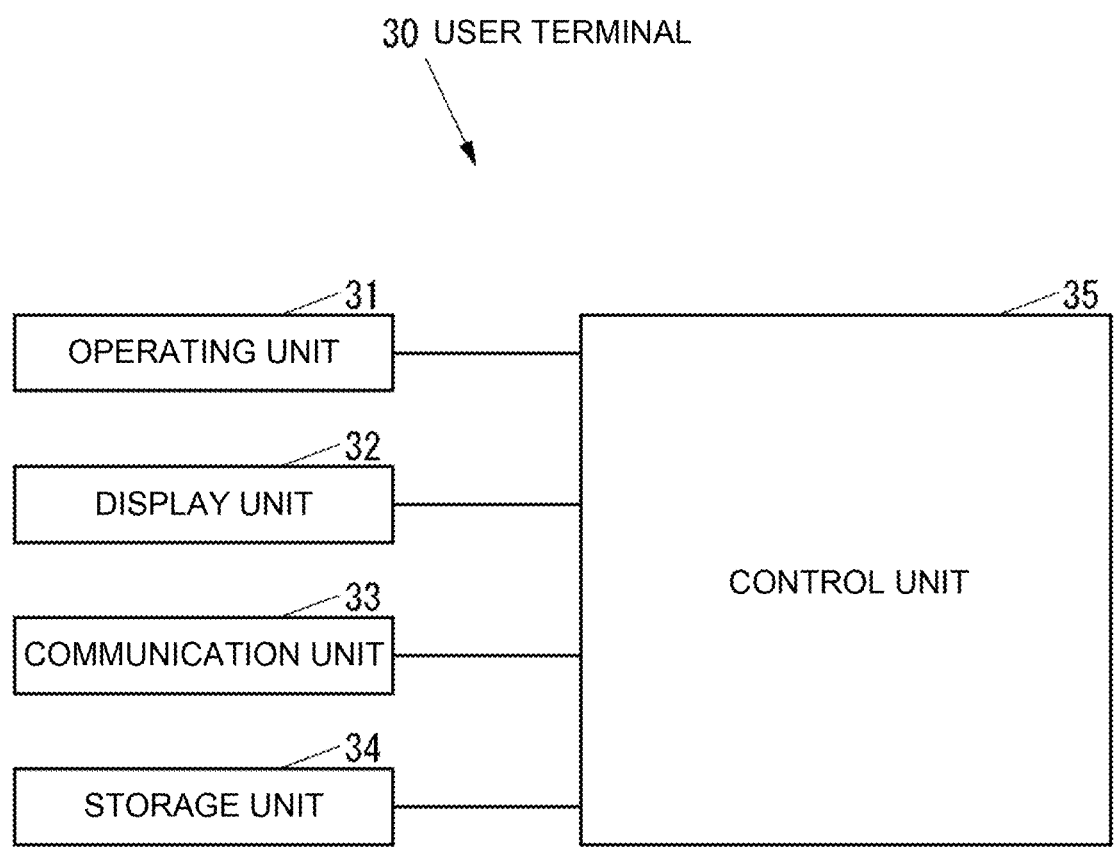
FIG. 4 is a block diagram of a user terminal illustrated in FIG. 1.

FIG. 4 is a block diagram of the user terminal 30.

As illustrated in FIG. 4, the user terminal 30 includes: an operating unit 31 as an operation device, such as a keyboard and a mouse, with which various operations are input; a display unit 32 as a display device such as the LCD to display various types of information; a communication unit 33 as a communication device that communicates with the external device via the network such as the LAN or the Internet or directly by wire or wirelessly without interposing the network; a storage unit 34 as a non-volatile storage device, such as the semiconductor memory or the HDD, that stores various types of information; and a control unit 35 that controls the entire user terminal 30.

For example, the control unit 35 includes: a CPU; ROM that stores a program and various types of data; and RAM as a volatile storage device that is used as a work area of the CPU in the control unit 35. The CPU of the control unit 35 runs the program that is stored in the storage unit 34 or in the ROM of the control unit 35.

Figure 5:
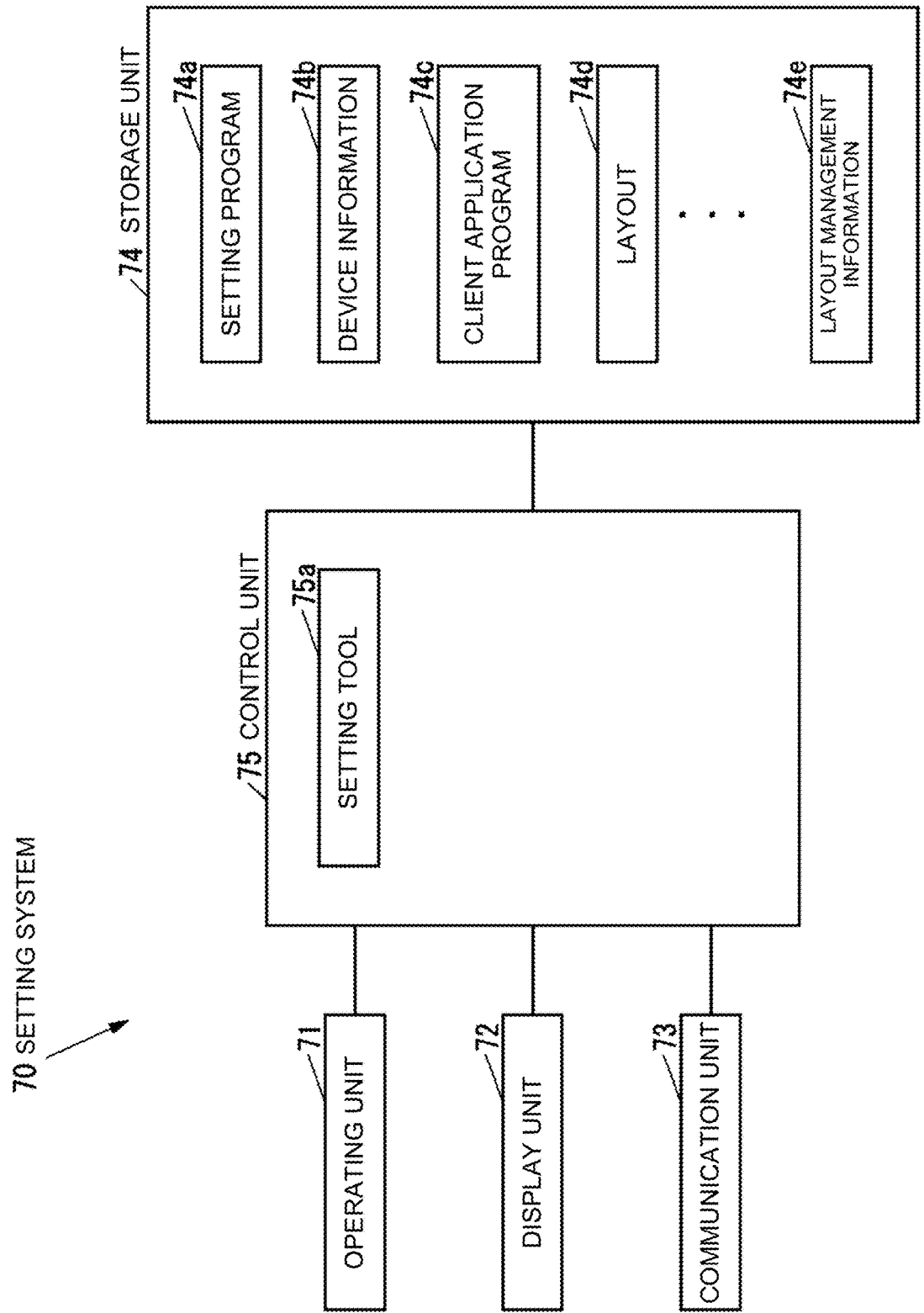
FIG. 5 is a block diagram of a setting system illustrated in FIG. 1 that is constructed of a single computer.

FIG. 5 is a block diagram of the setting system 70 that is constructed of a single computer.

As illustrated in FIG. 5, the setting system 70 includes: an operating unit 71 as an operation device such as a keyboard or a mouse, with which various operations are input; a display unit 72 as a display device such as the LCD to display various types of information; a communication unit 73 as a communication device that communicates with the external device via the network such as the LAN or the Internet or directly by wired or wirelessly without interposing the network; a storage unit 74 as a non-volatile storage device, such as the semiconductor memory or the HDD, that stores various types of information; and a control unit 75 that controls the entire setting system 70.

The storage unit 74 stores a setting program 74a for setting the client application program of the image forming device. For example, the setting program 74a may be installed in the setting system 70 in a manufacturing stage of the setting system 70, may be additionally installed in the setting system 70 from an external storage medium such as a compact disk (CD), a digital versatile disk (DVD), or the USB memory, or may be additionally installed in the setting system 70 from the network.

The storage unit 74 can store device information 74b that is information on the image forming device managed by a setting tool 75a, which will be described below.

Figure 6:
FIG. 6 is a table illustrating an example of device information illustrated in FIG. 5.

FIG. 6 is a table illustrating an example of the device information 74b.

The device information 74b illustrated in FIG. 6 includes, per image forming device: a product name; a host name; an Internet Protocol (IP) address; a serial ID as identification information of the image forming device; and a media access control (MAC) address as identification information of the image forming device.

As illustrated in FIG. 5, the storage unit 74 can store a client application program 74c that is installed in the image forming device.

The storage unit 74 can store a layout 74d of the operation screen of the image forming device. The storage unit 74 can store at least one layout of the operation screen of the image forming device in addition to the layout 74d.

The storage unit 74 can store layout management information 74e for managing the layout of the operation screen of the image forming device.

Figure 7:
FIG. 7 is a table illustrating an example of layout management information illustrated in FIG. 5.

FIG. 7 is a table illustrating an example of the layout management information 74e.

The layout management information 74e illustrated in FIG. 7 indicates, per image forming device, the identification information of the image forming device and the layout applied to the image forming device in a mutually associated manner. In FIG. 7, "Device a", "Device b", "Device c", and the like are described as the identification information of the image forming devices. However, the actual identification information of the image forming device is, for example, at least one of the serial ID and the MAC address of the image forming device.

As illustrated in FIG. 5, for example, the control unit 75 includes: a CPU; ROM that stores a program and various types of data; and RAM as a volatile storage device that is used as a work area of the CPU in the control unit 75. The CPU of the control unit 75 runs the program that is stored in the storage unit 74 or in the ROM of the control unit 75.

The control unit 75 runs the setting program 74a and thereby implements the setting tool 75a. The setting tool 75a can install the client application program in the image forming device.

Next, a description will be made on operation of the information processing system 10.

A description will firstly be made on operation of the setting system 70 in the case where information on the new image forming device is added to the device information 74b.

Figure 8:
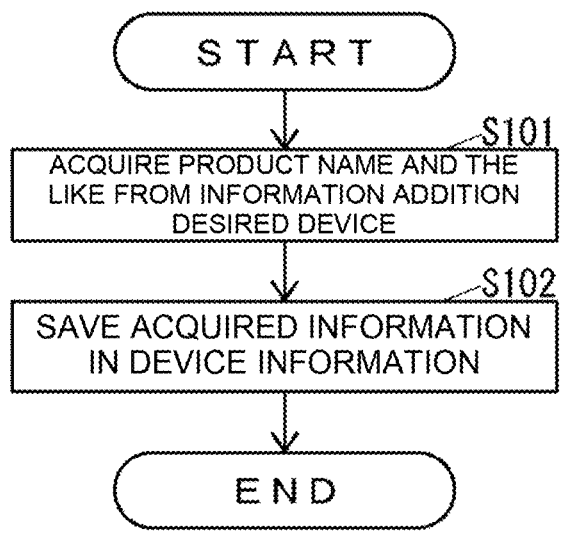
FIG. 8 is a flowchart of operation of the setting system illustrated in FIG. 5 in the case where information on a new image forming device is added to the device information.

FIG. 8 is a flowchart of the operation of the setting system 70 in the case where the information on the new image forming device is added to the device information 74b.

After logging in to the setting tool 75a of the setting system 70 via the user terminal, an administrator of the image forming device can input an instruction for adding the information on the new image forming device to the device information 74b (hereinafter referred to as an "information adding instruction") to the setting tool 75a via the user terminal. The administrator of the image forming device includes, in the information adding instruction, at least one of the IP address and the host name of the image forming device, the information of which is desired to be added to the device information 74b (hereinafter referred to as an "information addition desired device"). When accepting the information adding instruction, the setting tool 75a performs the operation illustrated in FIG. 8.

As illustrated in FIG. 8, the setting tool 75a acquires the product name, the host name, the IP address, the serial ID, and the MAC address of the information addition desired device from the information addition desired device (S101). Here, the setting tool 75a accesses the information addition desired device by using at least one of the IP address and the host name of the information addition desired device included in the information adding instruction.

After the processing in S101, the setting tool 75a saves the information acquired in S101 in the device information 74b (S102), and terminates the operation illustrated in FIG. 8.

Next, a description will be made on operation of the setting system 70 in the case where a list of the image forming devices that are managed by the setting tool 75a (hereinafter referred to as a "device list") is displayed.

Figure 9:
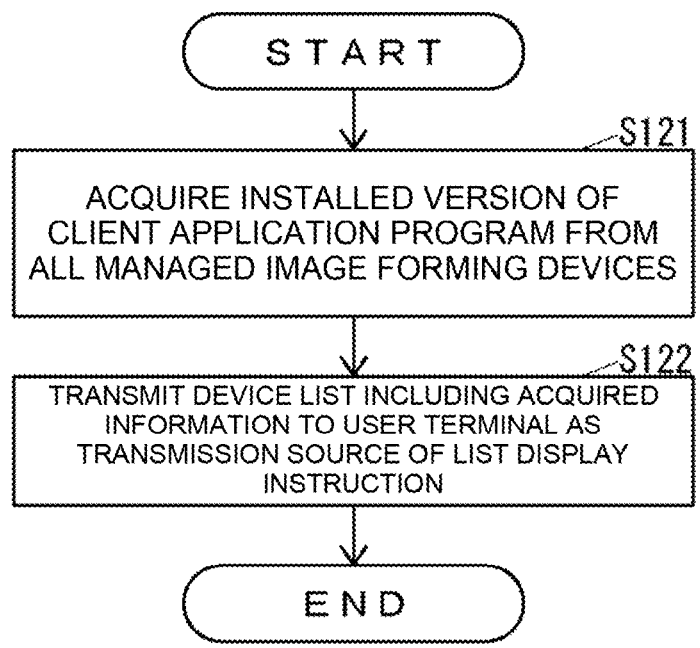
FIG. 9 is a flowchart of operation of the setting system illustrated in FIG. 5 in the case where a device list is displayed.

FIG. 9 is a flowchart of the operation of the setting system 70 in the case where the device list is displayed.

After logging in to the setting tool 75a of the setting system 70 via the user terminal, the administrator of the image forming device can input an instruction for displaying the device list (hereinafter referred to as a "list display instruction") to the setting tool 75a via the user terminal. When accepting the list display instruction, the setting tool 75a performs the operation illustrated in FIG. 9.

As illustrated in FIG. 9, the setting tool 75a acquires a version of the client application program, which is installed in the image forming device, (hereinafter referred to as an "install version") from all the image forming devices managed by the setting tool 75a itself (S121). Here, the setting tool 75a accesses the image forming device by using at least one of the IP address and the host name of the image forming device included in the device information 74b.

After the processing in S121, the setting tool 75a transmits the device list, which includes the information acquired in S121, to the user terminal as a transmission source of the list display instruction (S122), and terminates the operation illustrated in FIG. 9.

When the device list is transmitted from the setting tool 75a in S122, the user terminal displays the device list, which is transmitted from the setting tool 75a, on the display unit of the user terminal.

FIG. 10 is a table illustrating an example of the device list that is displayed on the user terminal.

As illustrated in FIG. 10, the device list includes, per the image forming device, the product name, the host name, the IP address, the serial ID, the MAC address, and the installed version. In the device list illustrated in FIG. 10, the image forming device for which a value in an installed version column is "NONE" is the image forming device in which the client application program is not installed.

Next, a description will be made on operation of the setting system 70 in the case where the client application program is installed in the image forming device.

Figure 11:
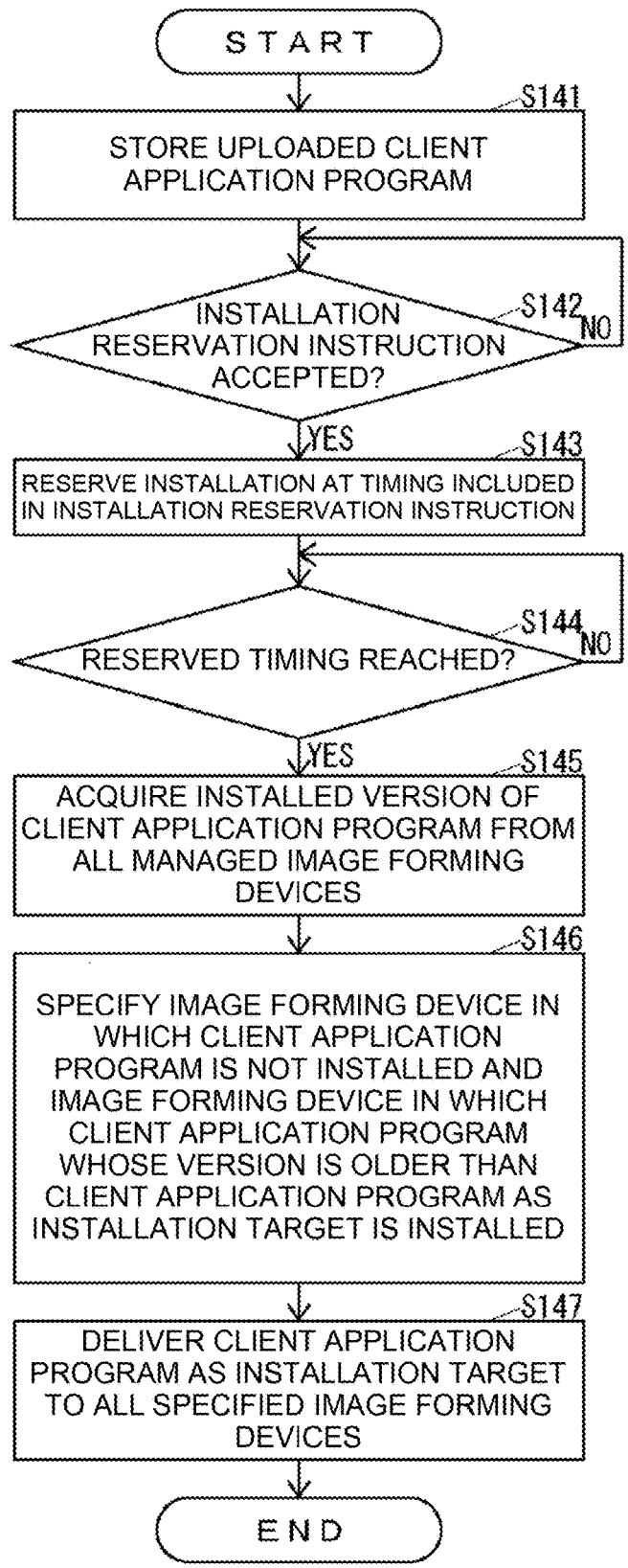
FIG. 11 is a flowchart of operation of the setting system illustrated in FIG. 5 in the case where a client application program is installed in the image forming device.

FIG. 11 is a flowchart of the operation of the setting system 70 in the case where the client application program is installed in the image forming device.

After logging in to the setting tool 75a of the setting system 70 via the user terminal, the administrator of the image forming device can upload the client application program to be installed in the image forming device to the setting tool 75a via the user terminal. When the client application program is uploaded, the setting tool 75a performs the operation illustrated in FIG. 11.

As illustrated in FIG. 11, the setting tool 75a stores the uploaded client application program as the client application program 74c in the storage unit 74 (S141).

Next, until determining that an instruction for reserving installation of the client application program (hereinafter referred to as an "installation reservation instruction") in the image forming device is accepted, the setting tool 75a determines whether the installation reservation instruction has been accepted (S142). Here, the administrator of the image forming device can input the installation reservation instruction to the setting tool 75a via the user terminal. For example, the administrator of the image forming device can specify, in the installation reservation instruction, as installation timing of the client application program in the image forming device, any of immediate timing, a specific date and time specified by the administrator of the image forming device, specific time in each day specified by the administrator of the image forming device, a specific day of the week specified by the administrator of the image forming device, and a specific day of the month specified by the administrator of the image forming device.

If determining that the installation reservation instruction has been accepted in S142, the setting tool 75a reserves the installation of the client application program in the image forming device at the timing included in the installation reservation (S143).

After the processing in S143, the setting tool 75a determines whether the timing reserved in S143 has been reached until determining that the timing reserved in S143 has been reached (S144).

If determining that the timing reserved in S143 has been reached in S144, the setting tool 75a acquires the installed version of the client application program in the image forming device from all the image forming devices managed by the setting tool 75a itself (S145). Here, the setting tool 75a accesses the image forming device by using at least one of the IP address and the host name of the image forming device included in the device information 74b.

Next, based on the information acquired in step S145, the setting tool 75a specifies the image forming device in which the client application program is not installed and the image forming device in which the client application program whose version is older than the client application program 74c, which is an installation target and is stored in S141, is installed (S146).

Next, the setting tool 75a delivers the client application program 74c, which is the installation target and is stored in S141, to all the image forming devices specified in S146 (S147), and terminates the operation illustrated in FIG. 11.

The control unit in the image forming device, to which the client application program is delivered from the setting tool 75a, immediately installs the client application program, which is delivered from the setting tool 75a, in the image forming device itself.

Next, a description will be made on operation of the setting system 70 in the case where the layout of the operation screen of the image forming device is saved.

Figure 12:
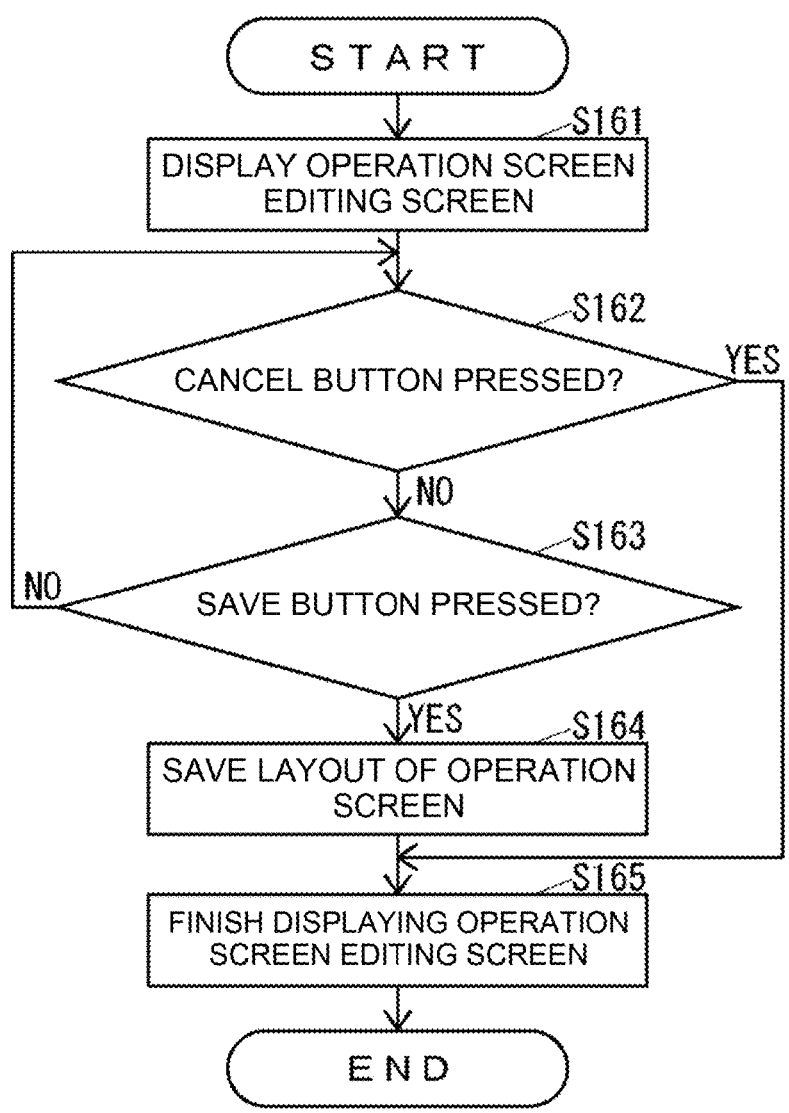
FIG. 12 is a flowchart of operation of the setting system illustrated in FIG. 5 in the case where a layout of an operation screen of the image forming device is saved.

FIG. 12 is a flowchart of the operation of the setting system 70 in the case where the layout of the operation screen of the image forming device is saved.

After logging in to the setting tool 75a of the setting system 70 via the user terminal, the administrator of the image forming device can input an instruction for starting editing of the layout of the operation screen of the image forming device (hereinafter referred to as an "editing start instruction") to the setting tool 75a via the user terminal. When accepting the editing start instruction, the setting tool 75a performs the operation illustrated in FIG. 12.

As illustrated in FIG. 12, the setting tool 75a causes the user terminal as a transmission source of the editing start instruction to display an operation screen editing screen 90 (see FIG. 13) for editing of the layout of the operation screen of the image forming device (S161). Accordingly, the control unit in the user terminal as the transmission source of the editing start instruction displays the operation screen editing screen 90 on the display unit of the own user terminal, and transmits, to the setting system 70, an operation on the operation screen editing screen 90 via the operating unit of the own user terminal.

Figure 13:
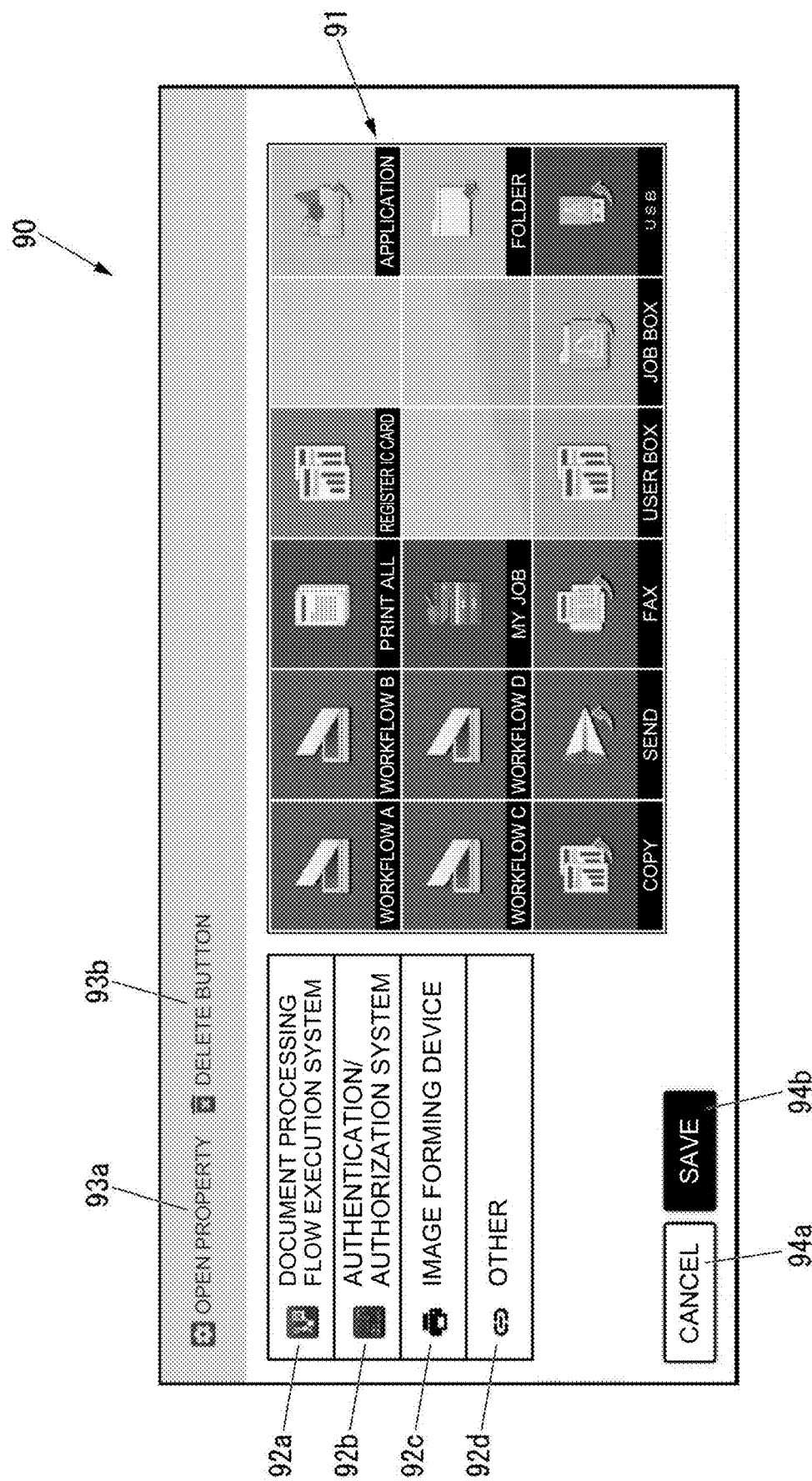
FIG. 13 is a view illustrating an example of an operation screen editing screen that is displayed on the display unit of the user terminal illustrated in FIG. 1.

FIG. 13 is a view illustrating an example of the operation screen editing screen 90 that is displayed on the display unit of the user terminal.

As illustrated in FIG. 13, the operation screen editing screen 90 includes an operation screen area 91 illustrating an image of the layout of the operation screen of the image forming device. The operation screen area 91 is formed with a total of 18 rectangular areas in 3 rows and 6 columns. Each button is formed by the single or plural rectangular areas. That is, a maximum of 18 buttons can be arranged on the operation screen of the image forming device.

The operation screen editing screen 90 includes: a "DOCUMENT PROCESSING FLOW EXECUTION SYSTEM" button 92a for adding, to the operation screen area 91, buttons associated with the functions of the document processing flow execution system 40, such as the "WORKFLOW A" button, the "WORKFLOW B" button, the "WORKFLOW C" button, and the "WORKFLOW D" button; an "AUTHENTICATION/AUTHORIZATION SYSTEM" button 92b for adding, to the operation screen area 91, buttons associated with the functions of the authentication/ authorization system 50, such as the "PRINT ALL" button, the "MY JOB" button, and the "REGISTER IC CARD" button; an "IMAGE FORMING DEVICE" button 92c for adding, to the operation screen area 91, buttons associated with the functions of the image forming device, such as the "COPY" button, the "SEND" button, the "FAX" button, the "USER BOX" button, the "JOB BOX" button, the "USB" button, and the "APPLICATION" button; and an "OTHER" button 92d for adding the "FOLDER" button to the operation screen area 91.

The operation screen editing screen 90 includes: an "OPEN PROPERTY" button 93a for setting properties of the button selected in the operation screen area 91; and a "DELETE BUTTON" button 93b for deleting the button selected in the operation screen area 91. The properties of the buttons are arrangement, size, a color, a name, and an icon image of the button in the operation screen area 91. The color of the button in the operation screen area 91 is a background color of the icon image of the button in the operation screen area 91. The name of the button in the operation screen area 91 is a character string that is arranged below the icon image in the button in the operation screen area 91.

The operation screen editing screen 90 includes: a cancel button 94a for canceling editing of the layout of the operation screen of the image forming device; and a save button 94b for saving the layout of the operation screen of the image forming device.

As illustrated in FIG. 12, after the processing in S161, the setting tool 75a determines whether the cancel button 94a has been pressed (S162).

If determining in S162 that the cancel button 94a has not been pressed, the setting tool 75a determines whether the save button 94b has been pressed (S163).

If determining in S163 that the save button 94b has not been pressed, the setting tool 75a executes the processing in S162.

If determining in S163 that the save button 94b has been pressed, the setting tool 75a saves the layout of the operation screen of the image forming device, which is set on the operation screen editing screen 90, in the storage unit 74 (S164).

If determining in S162 that the cancel button 94a has been pressed, or when executing the processing in S164, the setting tool 75a terminates display of the operation screen editing screen 90 in the user terminal (S165), and terminates the operation illustrated in FIG. 12.

Next, a description will be made on operation of the setting system 70 in the case where the layout to be applied to the image forming device is set.

After logging in to the setting tool 75a via the user terminal, the administrator of the image forming device can input an instruction for setting the layout to be applied to the image forming device (hereinafter referred to as a "layout setting instruction") to the setting system 70 via the user terminal.

When accepting the layout setting instruction, the setting tool 75a of the setting system 70 changes the layout management information 74e according to the accepted layout setting instruction.

Next, a description will be made on operation of the information processing system 10 in the case where the user logs in to the image forming device 20 by using the combination of the user name and the password.

Figure 14:
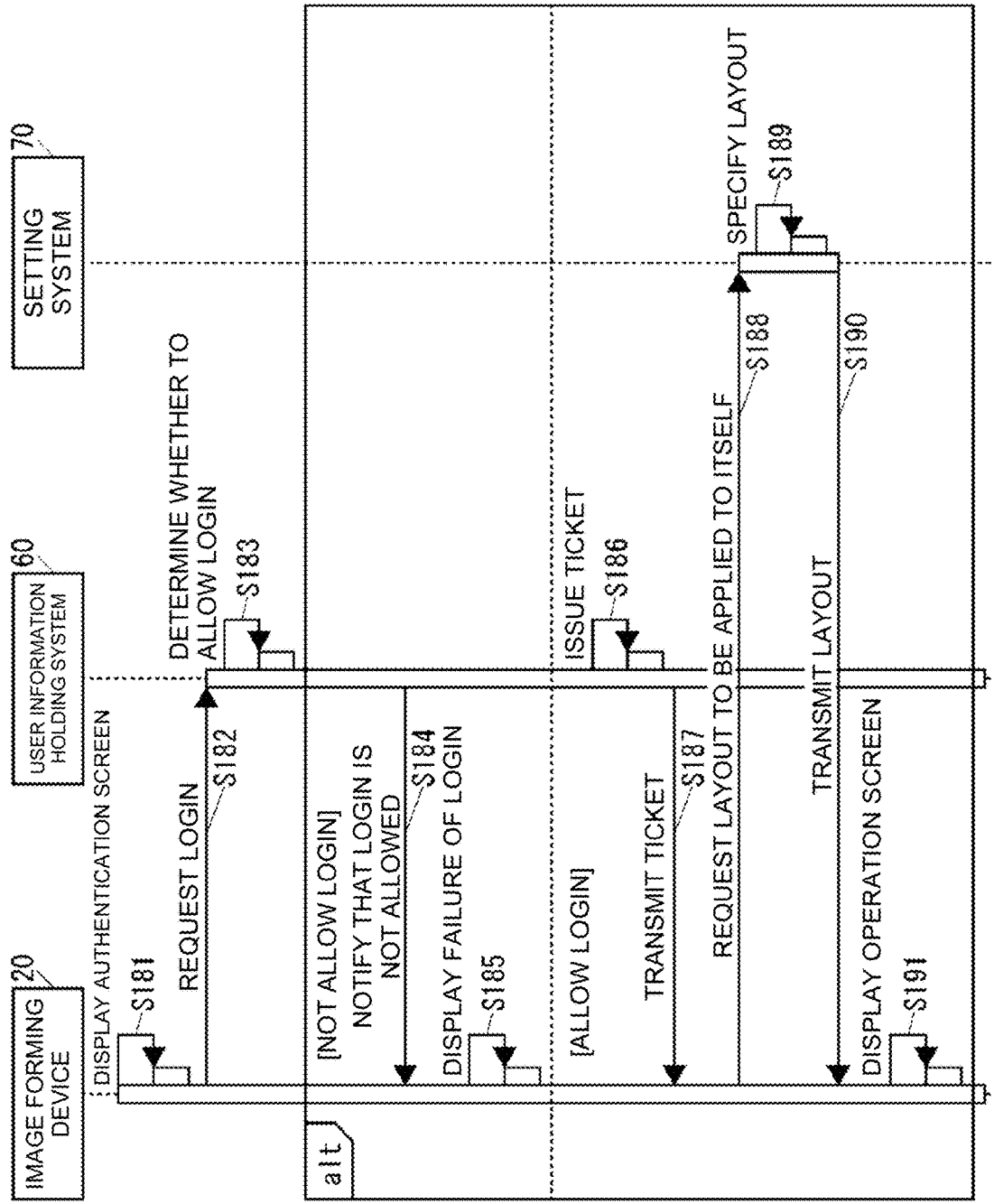
FIG. 14 is a sequence diagram of operation of the information processing system illustrated in FIG. 1 in the case where a user logs in to the image forming device by using a combination of a user name and a password.

FIG. 14 is a sequence diagram of the operation of the information processing system 10 in the case where the user logs in to the image forming device 20 by using the combination of the user name and the password.

The operation illustrated in FIG. 14 is operation when the login method by using the combination of the user name and the password is included in the login method information 27c in the image forming device 20.

As illustrated in FIG. 14, in the case where the user is not currently logging in to the image forming device 20, the client application 28a of the image forming device 20 displays, on the display unit 22, the authentication screen on which the user logs in to the image forming device 20 (S181). Here, since the login method by using the combination of the user name and the password is included in the login method information 27c, the client application 28a adopts the login method by using the combination of the user name and the password as a login method on the authentication screen that is displayed in S181.

When login is instructed on the authentication screen, which is displayed in S181, the client application 28a requests the login of the user to the user information holding system 60 (S182). This request includes the combination of the user name and the password that is input by the user on the authentication screen displayed in S181 via the operating unit 21.

When receiving the request in S182, the user information holding system 60 determines whether to allow the login of the user (S183). Here, in the case where, of the combinations of the user names and the passwords that are held by the user information holding system 60 itself, the combination of the user name and the password that is included in the request in S182 is included, that is, in the case where authentication of the user is succeeded, the user information holding system 60 determines to allow the login of the user. On the other hand, in the case where, of the combinations of the user names and the passwords that are held by the user information holding system 60 itself, the combination of the user name and the password that is included in the request in S182 is not included, that is, in the case where the authentication of the user fails, the user information holding system 60 determines not to allow the login of the user.

If determining not to allow the login of the user in S183, the user information holding system 60 notifies the image forming device 20 that the login of the user is not allowed (S184). As a result, the client application 28a of the image forming device 20 displays failure of the login on the display unit 22 (S185), and terminates the operation illustrated in FIG. 14.

On the other hand, if the user information holding system 60 determines to allow the login of the user in S183, the user information holding system 60 issues a ticket indicating that the login of the user is allowed (S186), and transmits the ticket issued in S186 to the image forming device 20 (S187).

When receiving the ticket transmitted from the user information holding system 60 in S187, the client application 28a of the image forming device 20 requests the setting system 70 for the layout to be applied to the image forming device 20 itself (S188). The client application 28a includes at least one of the serial ID and the MAC address of the image forming device 20 itself in the request in S188.

When receiving the request in S188, the setting tool 75a of the setting system 70 specifies the layout to be applied to the image forming device 20 on the basis of at least one of the serial ID and the MAC address of the image forming device 20 included in the request in S188 and on the basis of the layout management information 74e (S189), and transmits the layout specified in S189 to the image forming device 20 (S190).

When receiving the layout transmitted from the setting system 70 in S190, the client application 28a of the image forming device 20 displays the operation screen corresponding to this layout on the display unit 22 (S191), and terminates the operation illustrated in FIG. 14.

Next, a description will be made on operation of the information processing system 10 in the case where the image forming device 20 uses the document processing flow execution system 40 by using the ticket that is transmitted from the user information holding system 60.

Figure 15:
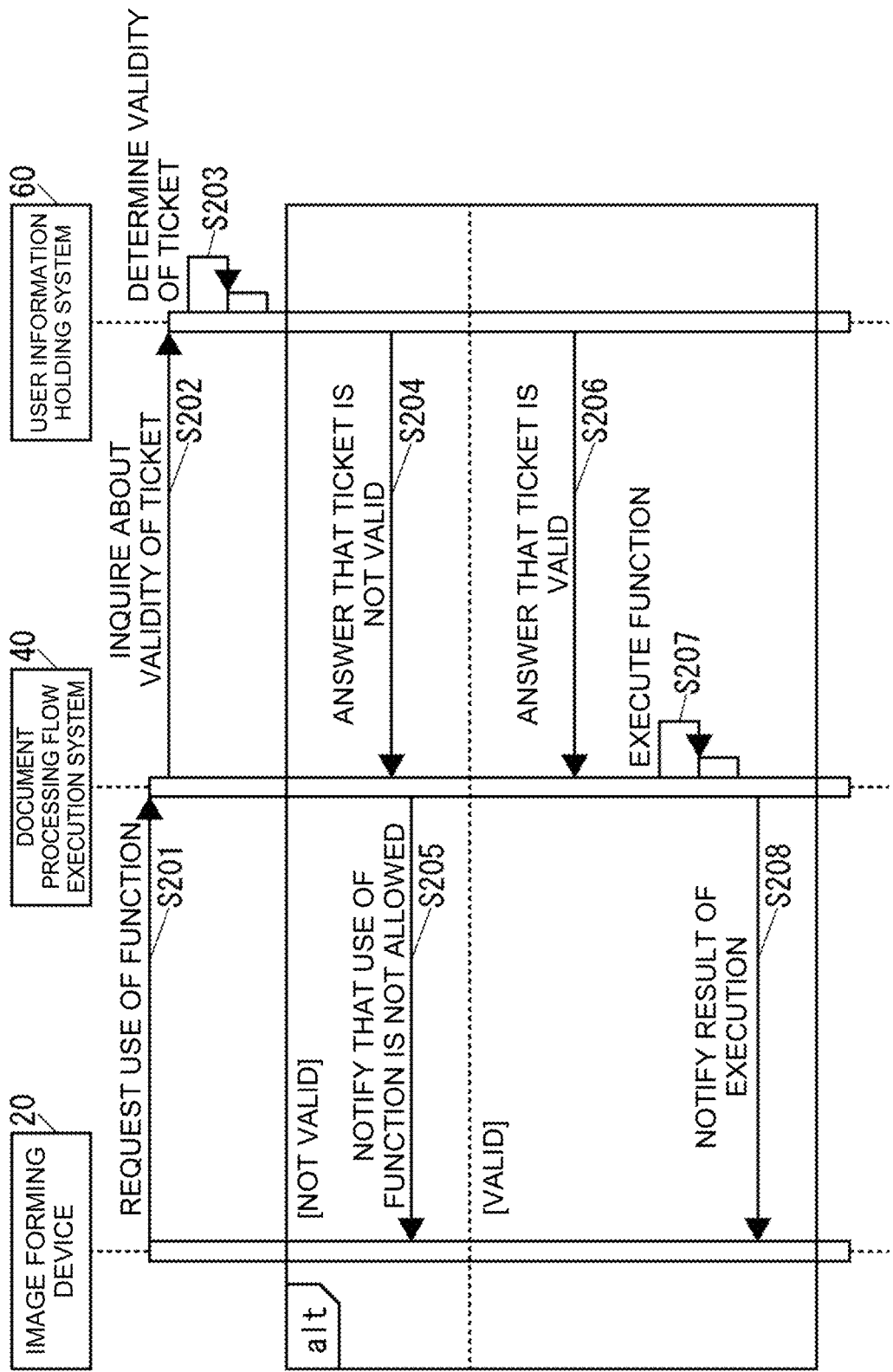
FIG. 15 is a sequence diagram of operation of the information processing system illustrated in FIG. 1 in the case where the image forming device uses a document processing flow execution system by using a ticket that is transmitted from a user information holding system.

FIG. 15 is a sequence diagram of the operation of the information processing system 10 in the case where the image forming device 20 uses the document processing flow execution system 40 by using the ticket that is transmitted from the user information holding system 60.

The user of the image forming device 20 can instruct the image forming device 20 to use the function of the document processing flow execution system 40 by pressing, for example, the "WORKFLOW" button in the operation screen that is displayed on the display unit 22 via the operating unit 21, or the like.

When the use of the function of the document processing flow execution system 40 is instructed, as illustrated in FIG. 15, the image forming device 20 requests the document processing flow execution system 40 for the use of the function of the document processing flow execution system 40 (S201). The image forming device 20 includes the ticket, which is transmitted from the user information holding system 60 in S187 (see FIG. 14), in the request in S201.

When receiving the request in S201, the document processing flow execution system 40 inquires the user information holding system 60 about validity of the ticket that is included in the request in S201 (S202).

When receiving the inquiry in S202, the user information holding system 60 determines the validity of the ticket, the validity of which is inquired about in S202 (S203).

If determining in S203 that the ticket, the validity of which is inquired about in S202, is not valid, the user information holding system 60 answers to the document processing flow execution system 40 that the ticket is not valid (S204). Accordingly, the document processing flow execution system 40 notifies the image forming device 20 that the use of the functions requested in S201 is not allowed (S205).

If determining in S203 that the ticket, the validity of which is inquired about in S202, is valid, the user information holding system 60 answers to the document processing flow execution system 40 that the ticket is valid (S206). Accordingly, the document processing flow execution system 40 executes the function requested in S201 (S207), and notifies the image forming device 20 of the result of the execution in S207 (S208).

The description has been made so far on the case where the image forming device 20 uses the document processing flow execution system 40 by using the ticket that is transmitted from the user information holding system 60. However, the same applies to a case where the image forming device 20 uses the authentication/authorization system 50 by using the ticket that is transmitted from the user information holding system 60.

Next, a description will be made on operation of the information processing system 10 in the case where the user logs in to the image forming device 20 by using the PIN code.

Figure 16:
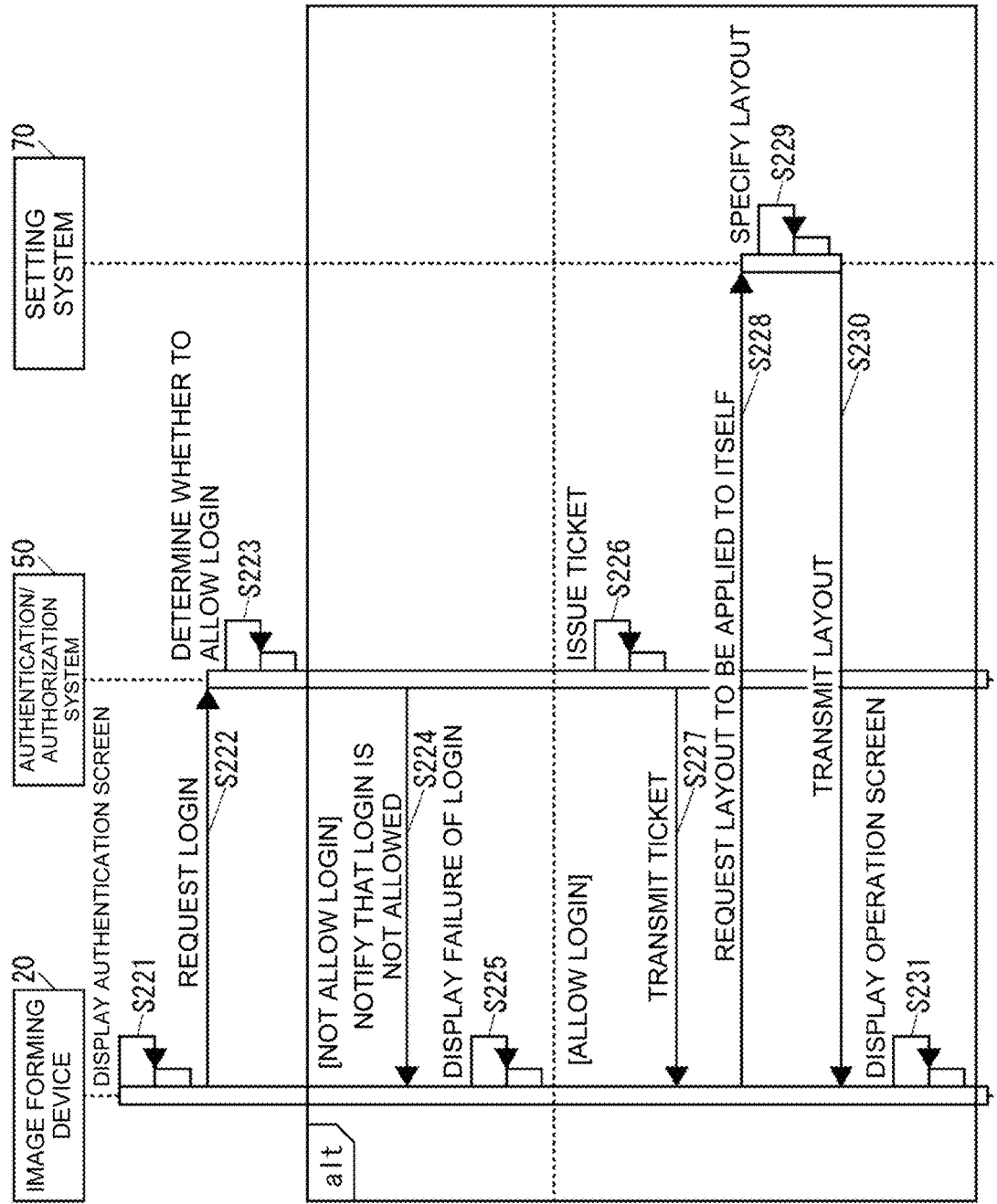
FIG. 16 is a sequence diagram of operation of the information processing system illustrated in FIG. 1 in the case where the user logs in to the image forming device by using a personal identification number (PIN) code.

FIG. 16 is a sequence diagram of the operation of the information processing system 10 in the case where the user logs in to the image forming device 20 by using the PIN code.

The operation illustrated in FIG. 16 is operation in the case where the login method by using the PIN code is indicated by the login method information 27c in the image forming device 20.

As illustrated in FIG. 16, in the case where the user is not currently logging in to the image forming device 20, the client application 28a of the image forming device 20 displays, on the display unit 22, the authentication screen on which the user logs in to the image forming device 20 (S221). Here, since the login method by using the PIN code is indicated by the login method information 27c, the client application 28a adopts the login method by using the PIN code as a login method on the authentication screen that is displayed in S221.

When login is instructed on the authentication screen, which is displayed in S221, the client application 28a requests the login of the user to the authentication/authorization system 50 (S222). This request includes the PIN code that is input by the user on the authentication screen displayed in S221 via the operating unit 21.

When receiving the request in S222, the authentication/authorization system 50 determines whether to allow the login of the user (S223). Here, in the case where, of the PIN codes that are held by the authentication/authorization system 50 itself, the PIN code that is included in the request in S222 is included, that is, in the case where the authentication of the user is succeeded, the authentication/authorization system 50 determines to allow the login of the user. On the other hand, in the case where, of the pin codes that are held by the authentication/authorization system 50 itself, the PIN code that is included in the request in S222 is not included, that is, in the case where the authentication of the user fails, the authentication/authorization system 50 determines not to allow the login of the user.

If determining not to allow the login of the user in S223, the authentication/authorization system 50 notifies the image forming device 20 that the login of the user is not allowed (S224). As a result, the client application 28a of the image forming device 20 displays the failure of the login on the display unit 22 (S225), and terminates the operation illustrated in FIG. 16.

On the other hand, if the authentication/authorization system 50 determines to allow the login of the user in S223, the authentication/authorization system 50 issues a ticket indicating that the login of the user is allowed (S226), and transmits the ticket issued in S226 to the image forming device 20 (S227).

When receiving the ticket transmitted from the authentication/authorization system 50 in S227, the client application 28a of the image forming device 20 requests the setting system 70 for the layout to be applied to the image forming device 20 itself (S228). The client application 28a includes at least one of the serial ID and the MAC address of the image forming device 20 itself in the request in S228.

When receiving the request in S228, the setting tool 75a of the setting system 70 specifies the layout to be applied to the image forming device 20 on the basis of at least one of the serial ID and the MAC address of the image forming device 20 included in the request in S228 and on the basis of the layout management information 74e (S229), and transmits the layout specified in S229 to the image forming device 20 (S230).

When receiving the layout transmitted from the setting system 70 in S230, the client application 28a of the image forming device 20 displays the operation screen corresponding to this layout on the display unit 22 (S231), and terminates the operation illustrated in FIG. 16.

In FIG. 16, the description has been made on the case where the user logs in to the image forming device 20 by using the PIN code. However, the same applies to a case where the user logs in to the image forming device 20 by using the IC card ID. However, in the case where the user logs in to the image forming device 20 by using the IC card ID, the IC card ID read by an IC card reader, which is not illustrated and is connected to the image forming device 20, is used instead of the PIN code.

Next, a description will be made on operation of the information processing system 10 in the case where the image forming device 20 uses the document processing flow execution system 40 by using the ticket that is transmitted from the authentication/authorization system 50.

Figure 17:
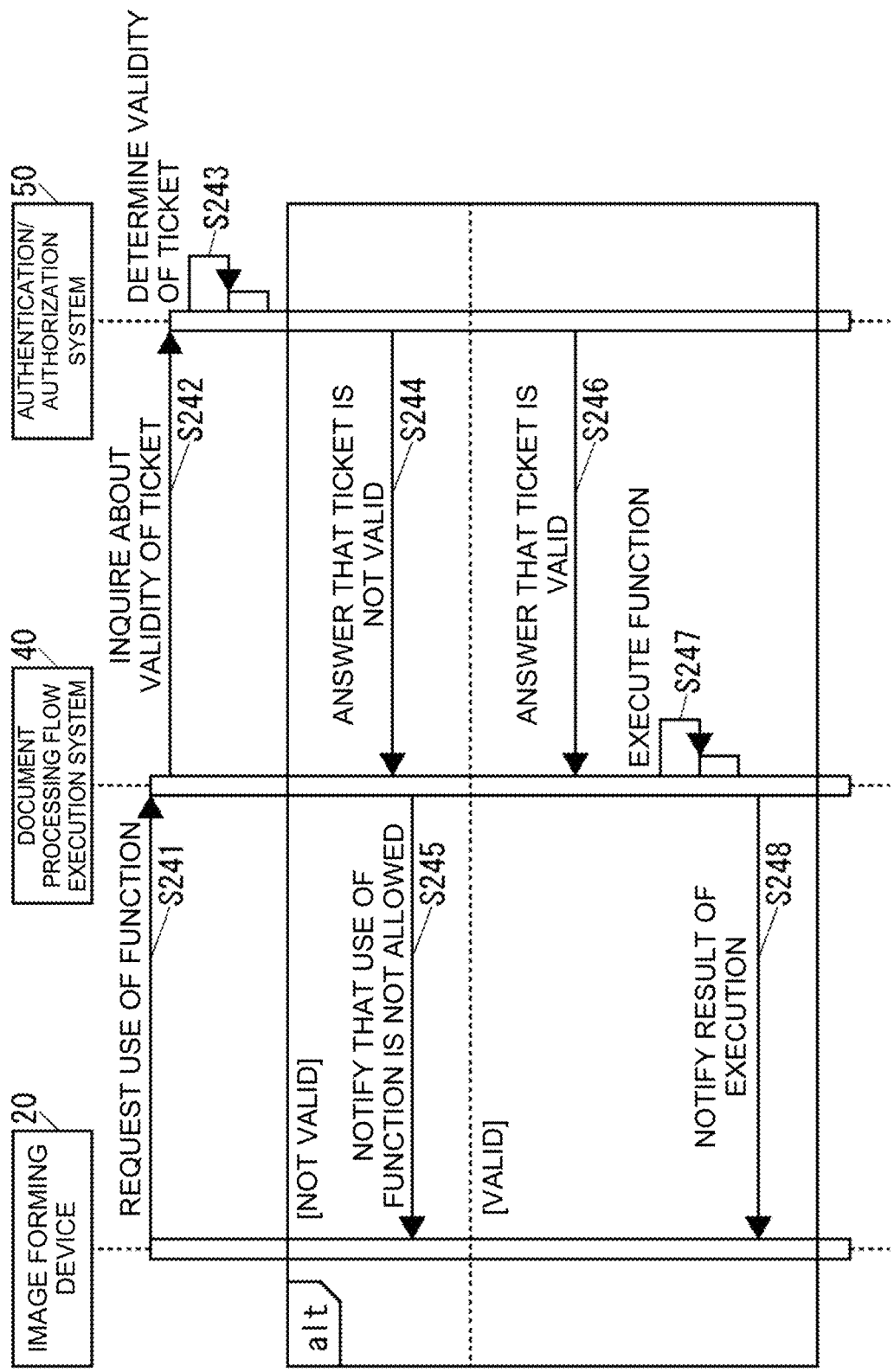
FIG. 17 is a sequence diagram of operation of the information processing system illustrated in FIG. 1 in the case where the image forming device uses the document processing flow execution system by using a ticket that is transmitted from an authentication/authorization system.

FIG. 17 is a sequence diagram of the operation of the information processing system 10 in the case where the image forming device 20 uses the document processing flow execution system 40 by using the ticket that is transmitted from the authentication/authorization system 50.

The user of the image forming device 20 can instruct the image forming device 20 to use the function of the document processing flow execution system 40 by pressing, for example, the "WORKFLOW" button in the operation screen that is displayed on the display unit 22 via the operating unit 21, or the like.

When the use of the function of the document processing flow execution system 40 is instructed, as illustrated in FIG. 17, the image forming device 20 requests the document processing flow execution system 40 for the use of the function of the document processing flow execution system 40 (S241). In the request in S241, the image forming device 20 includes the ticket that is transmitted from the authentication/authorization system 50 in S227 (see FIG. 16).

When receiving the request in S241, the document processing flow execution system 40 inquires the authentication/authorization system 50 about validity of the ticket included in the request in S241 (S242).

When receiving the inquiry in S242, the authentication/authorization system 50 determines the validity of the ticket, the validity of which is inquired about in S242 (S243).

If determining in S243 that the ticket, the validity of which is inquired about in S242, is not valid, the authentication/authorization system 50 answers to the document processing flow execution system 40 that the ticket is not valid (S244). Accordingly, the document processing flow execution system 40 notifies the image forming device 20 that the use of the functions requested in S241 is not allowed (S245).

On the other hand, if determining in S243 that the ticket, the validity of which is inquired about in S242, is valid, the authentication/authorization system 50 answers to the document processing flow execution system 40 that the ticket is valid (S246). Accordingly, the document processing flow execution system 40 executes the function requested in S241 (S247), and notifies the image forming device 20 of the result of the execution in S247 (S248).

The description has been made so far on the case where the image forming device 20 uses the document processing flow execution system 40 by using the ticket that is transmitted from the authentication/authorization system 50. However, the same applies to a case where the image forming device 20 uses the authentication/authorization system 50 by using the ticket that is transmitted from the authentication/authorization system 50.

As it has been described so far, in the case where the image forming device requests the layout (S188 or S228), the setting system 70 transmits the layout, which is associated with this image forming device, to the image forming device (S189 to S190 or S229 to S230). Accordingly, the administrator of the image forming device does not have to check the operation screen, which is displayed by the image forming device, on the image forming device for each of the image forming devices, but can check such an operation screen on the setting system 70. As a result, even in the case where the administrator manages a large number of the image forming devices, it is possible to reduce a possibility of presence of the image forming device that displays the inappropriate operation screen.

Since the setting system 70 installs the client application program, which requests the layout to the setting system 70, in the image forming device at the reserved timing (YES in S144, and S147), it is possible to reduce a burden on the administrator of the image forming device to manage a status of the installation of the client application program in the image forming device.

The setting system 70 installs the client application program as a reservation target only in the image forming device in which the client application program is not installed and in the image forming device in which the client application program whose version is older than the client application program as the reservation target is installed (S145 to S147). Thus, it is possible to reduce possibility of downtime of the image forming device due to unnecessary installation.

The electronic device in the present disclosure is the image forming device in the present embodiment. However, the electronic device may be other than the image forming device such as the PC, for example.

In the information processing system 10 according to the embodiment in the above-described disclosure, if allowing the login of the user (S183), the user information holding system 60 issues the ticket (S186) and transmits the ticket to the image forming device 20 (S187). Then, the client application 28a in the image forming device 20, which has received the ticket, requests the setting system 70 for the layout to be applied to the image forming device 20 itself (S188).

In such a case, the client application 28a includes at least one of the serial ID and the MAC address of the image forming device 20 itself in the request in S188. Consequently, the setting tool 75a of the setting system 70, which has received the request in S188, specifies the layout to be applied to the image forming device 20 on the basis of at least one of the serial ID and the MAC address of the image forming device 20 and on the basis of the layout management information 74e (S189), and transmits the layout to the image forming device 20 (S190).

Meanwhile, an information processing system according to this modified embodiment has a basic characteristic of capable of transmitting, to the image forming device, a layout associated with the information on the user who has logged in to the image forming device 20. Similar to the information processing system according to the embodiment in the above-described disclosure, the information processing system can exert the effect of capable of reducing the possibility of the presence of the image forming device that displays the inappropriate operation screen even in the case where the administrator manages the large number of the image forming devices.

A description will hereinafter be made on a configuration of the information processing system 10 according to the present modified embodiment. In the following description, the same components as those in the information processing system 10 according to the embodiment of the above-described disclosure will be denoted by the same reference numerals, the description thereon will not be made unless otherwise necessary.

Figure 18:
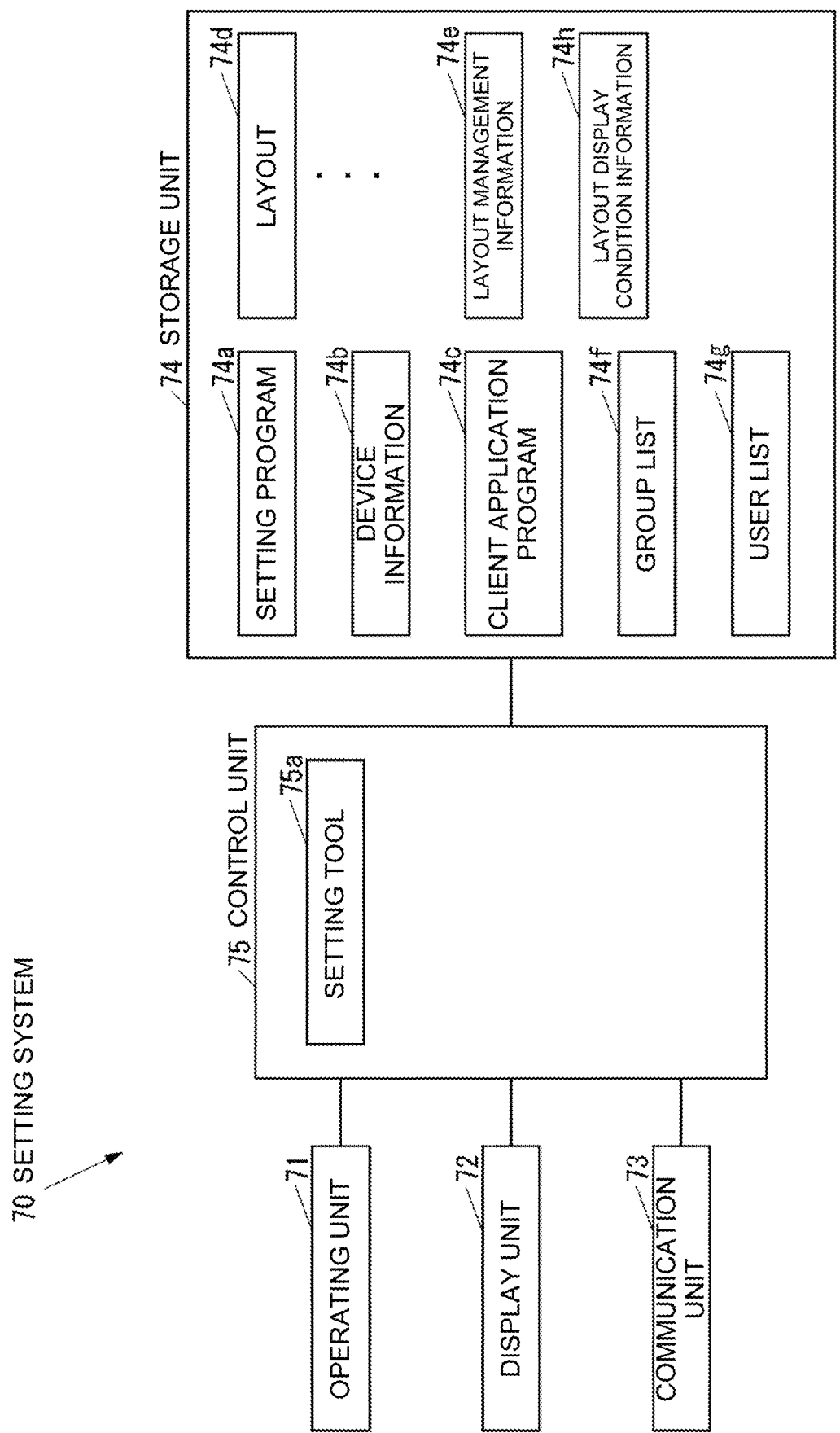
FIG. 18 is a block diagram of a case where a setting system according to a modified embodiment of the information processing system according to the embodiment of the present disclosure is constructed of a single computer.

The overall configuration of the information processing system 10 according to the present modified embodiment is the same as the configuration of the information processing system 10 according to the embodiment of the above-described disclosure illustrated in FIG. 1, and includes the image forming device 20 as the electronic device, the user terminal 30 used by the user, the document processing flow execution system 40 that executes the document processing flow, the authentication/authorization system 50 that authenticates and authorizes the user, the user information holding system 60 that holds the user information, the setting system 70 that sets the operation screen in the image forming device 20, and the network 11 that communicatively connects these. The configurations of these components are the same as the configurations that have been described with reference to FIG. 1 to FIG. 6 for the information processing system according to the embodiment of the above-described disclosure. However, in the information processing system 10 according to the present modified embodiment, as illustrated in FIG. 18, the storage unit 74 of the setting system 70 illustrated in FIG. 5 can store: a group list 74f that is a list of groups of general users of the image forming device 20; a user list 74g that is a list of the general users of the image forming device 20; and layout display condition information 74h that indicates a condition for displaying the layout in the image forming device 20. Accordingly, the layout management information 74e not only associates the identification information of the image forming device 20 illustrated in FIG. 6 with the layout of the operation screen of the image forming device, but also, as illustrated in FIG. 21, associates identification information of each of the groups and each of the general users and types of the image forming devices 20, the groups, and the general users with the layout of the operation screen of the image forming device 20.

Figure 19:
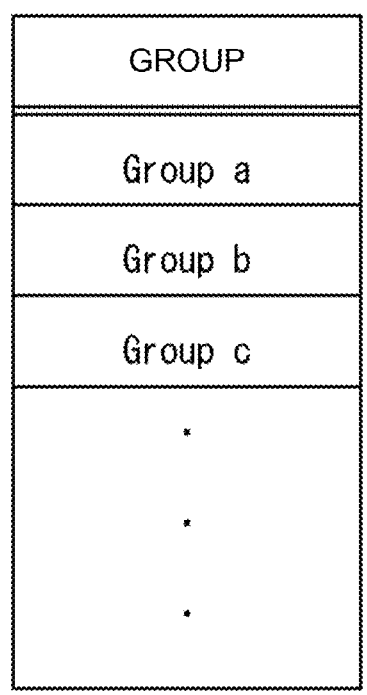
FIG. 19 is a table illustrating an example of a group list illustrated in FIG. 18.

The storage unit 74 can store the group list 74f that is the list of the groups of the general users of the image forming device 20. FIG. 19 is a table illustrating an example of the group list 74f.

The group list 74f illustrated in FIG. 19 indicates the groups of the general users of the image forming device 20 managed by the setting tool 75a, which will be described below.

FIG. 20 is a table illustrating an example of the user list 74g. The user list 74g illustrated in FIG. 20 indicates the association of the general users of the image forming device 20 with the groups, to which these general users belong, managed by the setting tool 75a, which will be described below. In FIG. 20, "-" indicates absence of the group, to which the user belongs. That is, according to FIG. 20, "User a" does not belong to any of the groups.

FIG. 21 is a table illustrating an example of the layout management information 74e.

The layout management information 74e illustrates in FIG. 21 indicates association among the identification information of each of the image forming devices 20, the groups, and the general users, the types of the image forming devices 20, the groups, and the general users, and the layouts of the operation screens of the image forming devices. In FIG. 21, "Device", "Group", and "User", each of which is a value in a "TYPE" column, respectively indicate the image forming device 20, the group, and the general user. For example, the group specified by identification information of "Group a" is associated with "LAYOUT d". In FIG. 21, "Device a", "Device b", "Device c", and the like are described as the identification information of the image forming devices 20. However, the actual identification information of the image forming device is, for example, at least one of the serial ID and the MAC address of the image forming device 20. In FIG. 21, "-" indicates that the layout of the operation screen of the image forming device is not associated. That is, according to FIG. 21, the general user who is specified by the identification information "User a" is not at least personally associated with any of the layouts.

Hereinafter, the layout associated with the image forming device, the layout associated with the group, and the layout associated with the individual general user will respectively be referred to as a device layout, a group layout, and a user layout.

Figure 22:
FIG. 22 is a table illustrating an example of layout display condition information illustrated in FIG. 18.

FIG. 22 is a table illustrating an example of the layout display condition information 74h.

As illustrated in FIG. 22, the layout display condition information 74h includes: "DISPLAY METHOD" indicating a method for displaying the layout on the image forming device; "LAYOUT ALLOWED TO BE DISPLAYED" indicating which of the group layout and the user layout is allowed to be displayed; and "DISPLAY PRIORITY" indicating a priority order of display of the device layout, the group layout, and the user layout.

"DISPLAY METHOD" can be set to any of "DEVICE LAYOUT ONLY" as a method for only displaying the device layout on the image forming device, "USER SELECTION" as a method for displaying one selected by the user among the device layout, the group layout, and the user layout, "PRIORITY ORDER" as a method for displaying one with the higher priority, which is indicated by "DISPLAY PRIORITY", among the device layout, the group layout, and the user layout.

In FIG. 22, for the device layout, the group layout, and the user layout indicated in a "DISPLAY PRIORITY" column, the priority is higher toward the top. That is, in the example illustrated in FIG. 22, the user layout has the highest priority, and the device layout has the lowest priority.

Next, a description will be made on operation of the information processing system 10 according to the present modified embodiment.

Operation of the setting system 70 according to the present modified embodiment at the time of adding the information on the new image forming device 20 to the device information 74b (FIG. 8), operation of the setting system 70 at the time of displaying the device list (FIGS. 9 and 10), and operation of the setting system 70 at the time of installing the client application program in the image forming device 20 (FIG. 11) are the same as those in the information processing system 10 according to the embodiment of the above-described disclosure.

Next, a description will be made on operation of the setting system 70 in the case where the layout display condition information 74h is set.

Figure 23:
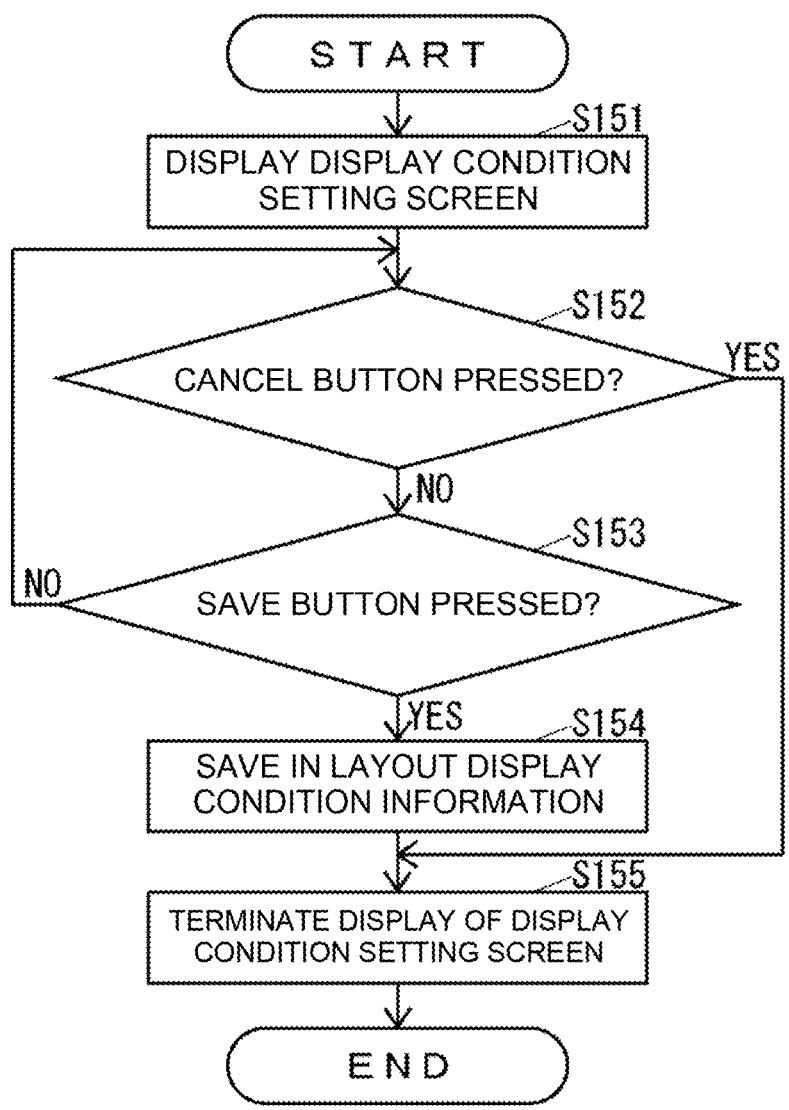
FIG. 23 is a flowchart of operation of the setting system illustrated in FIG. 18 in the case where the layout display condition information is set.

FIG. 23 is a flowchart of the operation of the setting system 70 in the case where the layout display condition information 74h is set.

After logging in to the setting tool 75a of the setting system 70 via the user terminal, the administrator of the image forming device 20 can input an instruction for starting setting of the layout display condition information 74h (hereinafter referred to as a "setting start instruction") to the setting tool 75a via the user terminal. When accepting the setting start instruction, the setting tool 75a performs the operation illustrated in FIG. 15.

As illustrated in FIG. 23, the setting tool 75a causes the user terminal as a transmission source of the setting start instruction to display a display condition setting screen 100 (see FIG. 24) for setting the layout display condition information 74h (S151). Accordingly, the control unit in the user terminal as the transmission source of the setting start instruction displays the display condition setting screen 100 on the display unit of the own user terminal, and transmits, to the setting system 70, an operation on the display condition setting screen 100 via the operating unit of the own user terminal.

Figure 24:
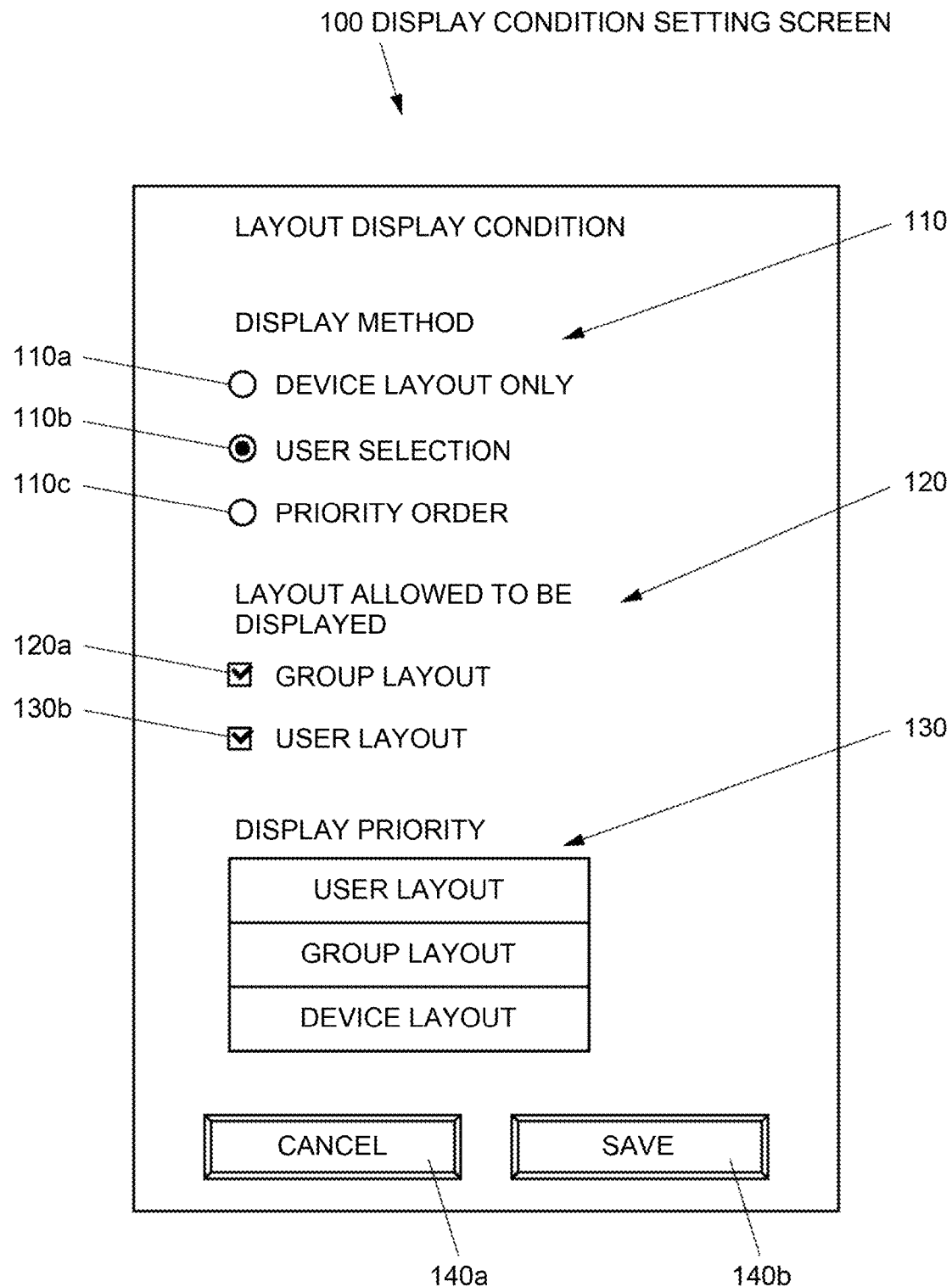
FIG. 24 is a view illustrating an example of a display condition setting screen that is displayed on a display unit of a user terminal in the setting system according to the modified embodiment of the information processing system according to the embodiment of the present disclosure.

FIG. 24 is a view illustrating an example of the display condition setting screen 100 that is displayed on the display unit of the user terminal.

As illustrated in FIG. 24, the display condition setting screen 100 includes: an area 110 for setting "DISPLAY METHOD" in the layout display condition information 74h; an area 120 for setting "LAYOUT ALLOWED TO BE DISPLAYED" in the layout display condition information 74h; an area 130 for setting "DISPLAY PRIORITY" in the layout display condition information 74h; a cancel button 140a for canceling the setting of the layout display condition information 74h; and a save button 140b for saving the setting of the layout display condition information 74h.

The area 110 includes: a radio button 110a for setting "DEVICE LAYOUT ONLY" as "DISPLAY METHOD"; a radio button 110b for setting "USER SELECTION" as "DISPLAY METHOD"; and a radio button 110c for setting "PRIORITY ORDER" as "DISPLAY METHOD". Only one of the radio buttons 110a to 110c can be selected.

The area 120 includes: a checkbox 120a for setting to allow the display of the group layout; and a checkbox 120b for setting to allow the display of the user layout.

The area 130 indicates the priority order of the device layout, the group layout, and the user layout. For the device layout, the group layout, and the user layout indicated in the area 130, the priority order is higher toward the top. The administrator of the image forming device 20 can change the priority order of the device layout, the group layout, and the user layout indicated in the area 130 via the operating unit of the user terminal.

As illustrated in FIG. 23, after the processing in S151, the setting tool 75a determines whether the cancel button 140a has been pressed (S152).

If determining in S152 that the cancel button 140a has not been pressed, the setting tool 75a determines whether the save button 140b has been pressed (S153).

If determining in S153 that the save button 140b has not been pressed, the setting tool 75a executes the processing in S152.

If determining in S153 that the save button 140b has been pressed, the setting tool 75a saves the layout display condition, which is set on the display condition setting screen 100, in the layout display condition information 74h (S154).

If determining in S152 that the cancel button 140a has been pressed, or when executing the processing in S154, the setting tool 75a terminates display of the display condition setting screen 100 in the user terminal (S155), and terminates the operation illustrated in FIG. 23.

The operation of the setting system 70 in the case of saving the layout of the operation screen of the image forming device 20 according to the present modified embodiment is the same as that in the information processing system 10 according to the embodiment of the above-described disclosure.

The description has been made so far on the example in which the administrator of the image forming device 20 creates the layout. However, the general user of the image forming device 20 can also create the layout in the same manner.

Next, a description will be made on operation of the setting system 70 in the case where the device layout in the present modified embodiment is set.

After logging in to the setting tool 75a via the user terminal, the administrator of the image forming device 20 can input an instruction for setting any of the layouts stored in the storage unit 74 as the device layout of any of the image forming devices 20 (hereinafter referred to as a "device layout setting instruction") to the setting system 70 via the user terminal. For example, the setting tool 75a allows the administrator himself/herself to only specify, in the device layout setting instruction, the layout created by the administrator of the image forming device 20 of the layouts stored in the storage unit 74.

When accepting the device layout setting instruction, the setting tool 75a of the setting system 70 changes the layout management information 74e according to the accepted device layout setting instruction.

Next, a description will be made on operation of the setting system 70 in the case where the group layout is set.

After logging in to the setting tool 75a via the user terminal, the administrator of the image forming device 20 can input an instruction for setting any of the layouts stored in the storage unit 74 as the group layout of any of the groups (hereinafter referred to as a "group layout setting instruction") to the setting system 70 via the user terminal. For example, the setting tool 75a allows the administrator himself/herself to only specify, in the group layout setting instruction, the layout created by the administrator of the image forming device 20 of the layouts stored in the storage unit 74.

When accepting the group layout setting instruction, the setting tool 75a of the setting system 70 changes the layout management information 74e according to the accepted group layout setting instruction.

The description has been made so far on the example in which the administrator of the image forming device 20 sets the group layout. However, the general user of the image forming device can also set the group layout in the same manner in regard to the group layout of the group to which the general user belongs.

Next, a description will be made on operation of the setting system 70 in the case where the user layout is set.

After logging in to the setting tool 75a via the user terminal, the administrator of the image forming device 20 can input an instruction for setting any of the layouts stored in the storage unit 74 as the user layout of any of the general users (hereinafter referred to as a "user layout setting instruction") to the setting system 70 via the user terminal. For example, the setting tool 75a allows the administrator himself/herself to only specify, in the user layout setting instruction, the layout created by the administrator of the image forming device 20 of the layouts stored in the storage unit 74.

When accepting the user layout setting instruction, the setting tool 75a of the setting system 70 changes the layout management information 74e according to the accepted user layout setting instruction.

The description has been made so far on the example in which the administrator of the image forming device 20 sets the user layout. However, the general user of the image forming device 20 can also set the user layout in the same manner in regard to the user layout of himself/herself.

A description will be made on operation of the information processing system 10 in the case where the user logs in to the image forming device 20 by using the combination of the user name and the password in the present modified embodiment.

Figure 25:
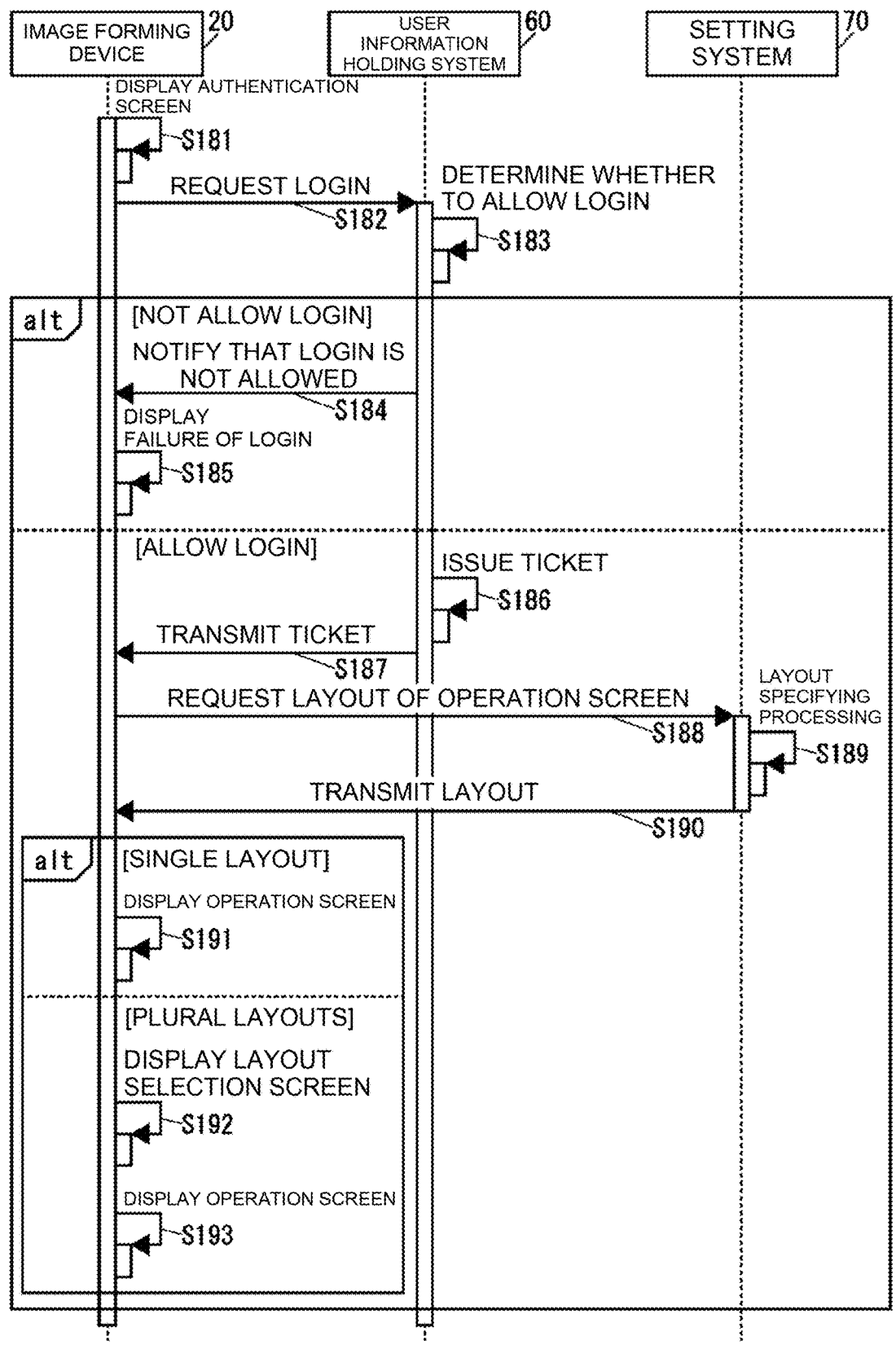
FIG. 25 is a sequence diagram of operation of the information processing system in the case where the user logs in to the image forming device by using the combination of the user name and the password in the setting system according to the modified embodiment of the information processing system according to the embodiment of the present disclosure.

FIG. 25 is a sequence diagram of the operation of the information processing system 10 in the case where the user logs in to the image forming device 20 by using the combination of the user name and the password.

The operation illustrated in FIG. 25 is operation when the login method by using the combination of the user name and the password is included in the login method information 27c in the image forming device 20.

In the case where the user is not currently logging in to the image forming device 20, the operation by the client application 28a of the image forming device 20 illustrated in FIG. 25 from operation for displaying the authentication screen for the user to log in to the image forming device 20 on the display unit 22 (S181) to operation for transmitted the issued ticket to the image forming device 20 (S187) are the same as those by the information processing system 10 according to the embodiment of the above-described disclosure.

When receiving the ticket transmitted from the user information holding system 60 in S187, the client application 28a of the image forming device 20 requests the setting system 70 for the layout of the operation screen (S188). The client application 28a includes, in the request in S188, at least one of the identification information of the user whose login is allowed by the user information holding system 60 and the identification information of the image forming device 20 itself, that is, the serial ID and the MAC address. The request for the layout by the client application of the image forming device to the setting system will hereinafter be referred to as a "layout request".

When receiving the layout request in S188, the setting tool 75a of the setting system 70 executes layout specifying processing to specify the layout of the operation screen on the basis of the layout management information 74e (S189).

Figure 26:
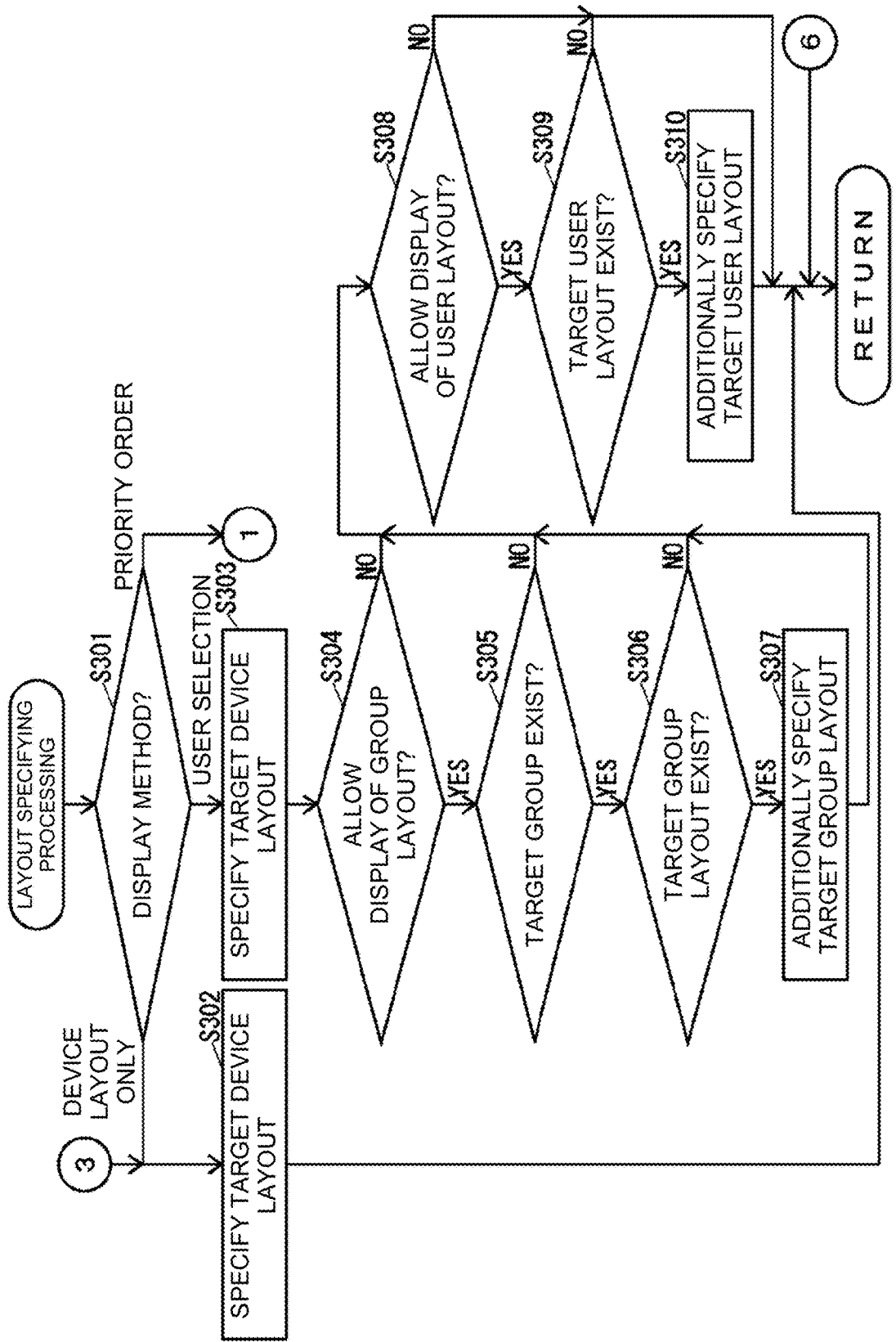
FIG. 26 is a flowchart of a part of layout specifying processing illustrated in FIG. 25.
Figure 27:
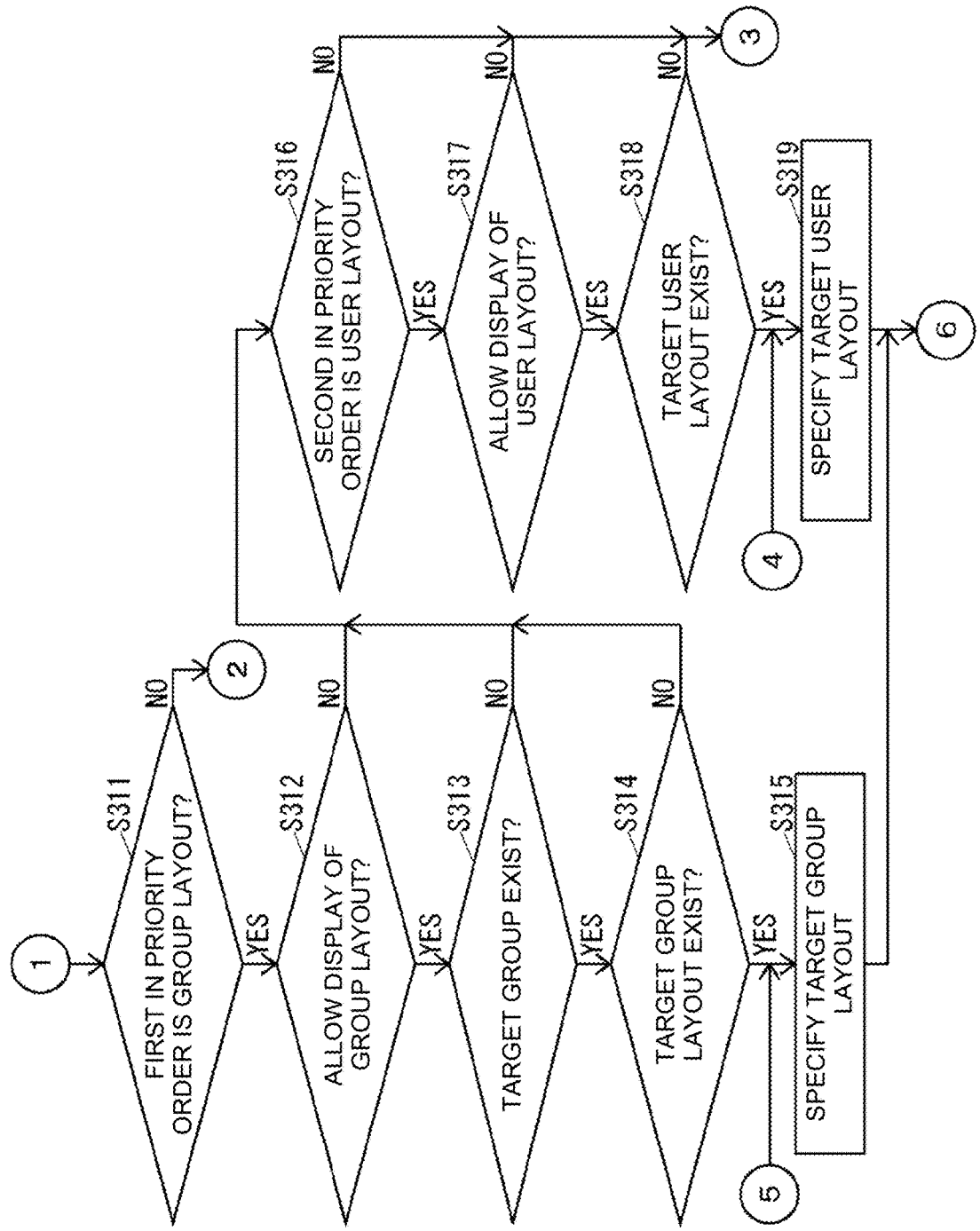
FIG. 27 is a flowchart following the flowchart illustrated in FIG. 26.
Figure 28:
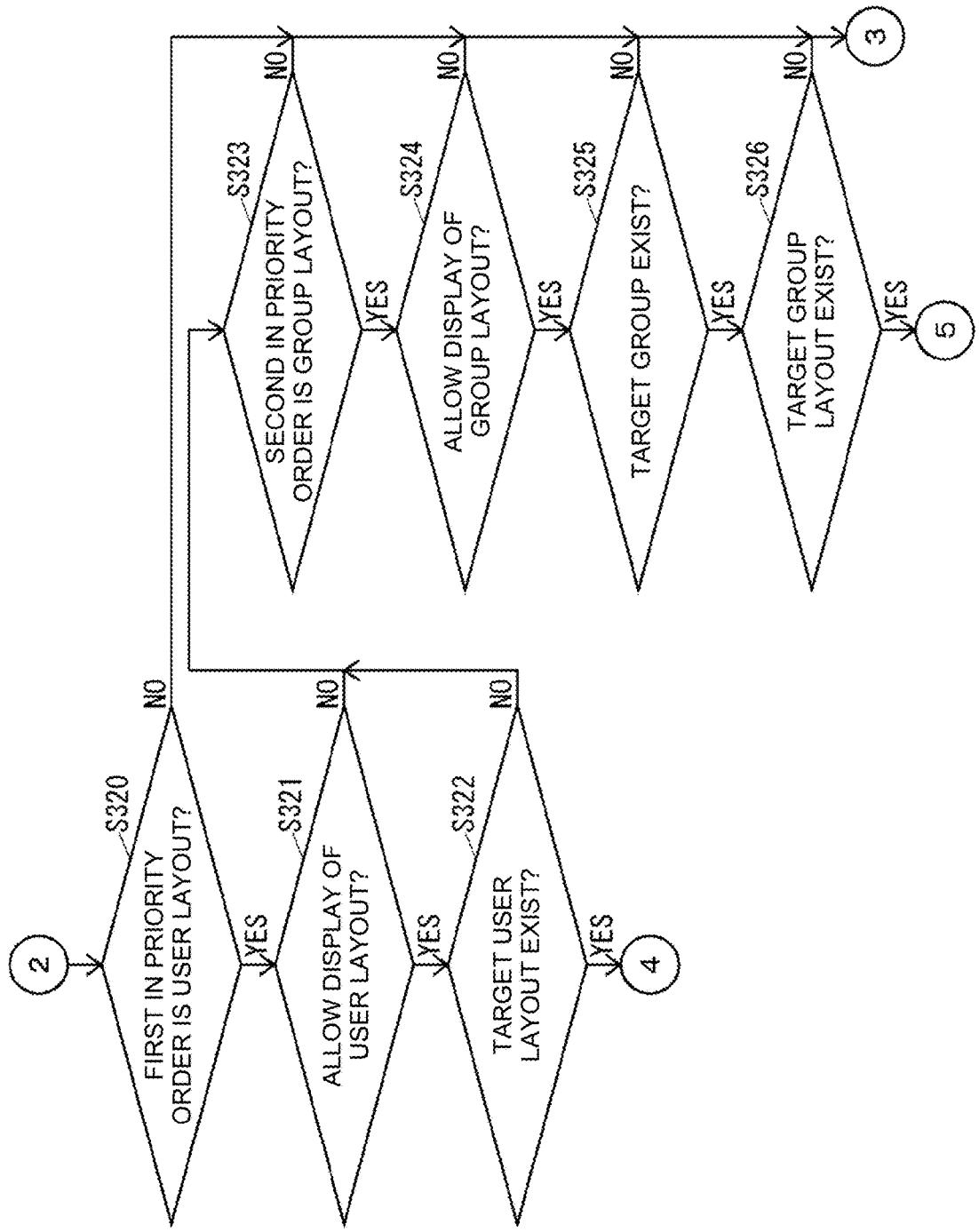
FIG. 28 is a flowchart following the flowchart illustrated in FIG. 27.

FIG. 26 is a flowchart of a part of the layout specifying processing illustrated in FIG. 25. FIG. 27 is a flowchart following the flowchart illustrated in FIG. 26. FIG. 28 is a flowchart following the flowchart illustrated in FIG. 27.

As illustrated in FIG. 26 to FIG. 28, the setting tool 75a of the setting system 70 determines "DISPLAY METHOD" in the layout display condition information 74h (S301).

If determining in S301 that the "DISPLAY METHOD" in the layout display condition information 74h is "DEVICE LAYOUT ONLY", the setting tool 75a specifies the device layout that is included in the layout request and is associated with the identification information of the image forming device 20 in the layout management information 74e (hereinafter referred to as "TARGET DEVICE LAYOUT") (S302), and terminates the layout specifying processing illustrated in FIG. 26 to FIG. 28.

If determining in S301 that "DISPLAY METHOD" in the layout display condition information 74h is "USER SELECTION", the setting tool 75a specifies the target device layout (S303).

Next, the setting tool 75a determines whether to allow the display of the group layout on the basis of "LAYOUT ALLOWED TO BE DISPLAYED" in the layout display condition information 74h (S304).

If determining in S304 to allow the display of the group layout, the setting tool 75a determines whether the group that is included in the layout request and is associated with the identification information of the user in the user list 74g (hereinafter referred to as a "target group") exists (S305).

If determining in S305 that the target group exists, the setting tool 75a determines whether the group layout that is associated with the target group in the layout management information 74e (hereinafter referred to as the "target group layout") exists (S306).

If determining in S306 that the target group layout exists, the setting tool 75a additionally specifies the target group layout (S307).

If the setting tool 75a determines in S304 not to allow the display of the group layout, determines in S305 that the target group does not exist, or determines in S306 that the target group layout does not exist, or if the processing in S307 is completed, the setting tool 75a determines whether to allow the display of the user layout on the basis of "LAYOUT ALLOWED TO BE DISPLAYED" in the layout display condition information 74h (S308).

If determining in S308 to allow the display of the user layout, the setting tool 75a determines whether the user layout that is included in the layout request and is associated with the identification information of the user in the layout management information 74e (hereinafter referred to as a "target user layout") exists (S309).

If determining in S309 that the target user layout exists, the setting tool 75a additionally specifies the target user layout (S310).

If the setting tool 75a determines in S308 not to allow the display of the user layout or determines in S309 that the target user layout does not exist, or if the processing of S310 is completed, the setting tool 75a terminates the layout specifying processing illustrated in FIG. 26 to FIG. 28.

If determining in S301 that "DISPLAY METHOD" in the layout display condition information 74h is "PRIORITY ORDER", the setting tool 75a determines whether the first priority order in "DISPLAY PRIORITY" in the layout display condition information 74h is the group layout (S311).

If determining in S311 that the first priority order in "DISPLAY PRIORITY" in the layout display condition information 74h is the group layout, the setting tool 75a determines whether to allow the display of the group layout on the basis of "LAYOUT ALLOWED TO BE DISPLAYED" in the layout display condition information 74h (S312).

If determining in S312 to allow the display of the group layout, the setting tool 75a determines whether the target group exists (S313).

If determining in S313 that the target group exists, the setting tool 75a determines whether the target group layout exists (S314).

If determining in S314 that the target group layout exists, the setting tool 75a specifies the target group layout (S315), and terminates the layout specifying processing illustrated in FIG. 26 to FIG. 28.

If determining in S312 not to allow the display of the group layout, determining in S313 that the target group does not exist, or determining in S314 that the target group layout does not exist, the setting tool 75a determines whether the second priority order in "DISPLAY PRIORITY" in the layout display condition information 74h is the user layout (S316).

If determining in S316 that the second priority order in "DISPLAY PRIORITY" in the layout display condition information 74h is the user layout, the setting tool 75a determines whether to allow the display of the user layout on the basis of "LAYOUT ALLOWED TO BE DISPLAYED" in the layout display condition information 74h (S317).

If determining in S317 to allow the display of the user layout, the setting tool 75a determines whether the target user layout exists (S318).

If determining in S318 that the target user layout exists, the setting tool 75a specifies the target user layout (S319), and terminates the layout specifying processing illustrated in FIG. 26 to FIG. 28.

If determining in S316 that the second priority order in "DISPLAY PRIORITY" in the layout display condition information 74h is not the user layout, determining in S317 not to allow the display of the user layout, or determining in S318 that the target user layout does not exist, the setting tool 75a specifies the target device layout (S302), and terminates the layout specifying processing illustrated in FIG. 26 to FIG. 28.

If determining in S311 that the first priority order in "DISPLAY PRIORITY" in the layout display condition information 74h is not the group layout, the setting tool 75a determines whether the first priority order in "DISPLAY PRIORITY" in the layout display condition information 74h is the user layout (S320).

If determining in S320 that the first priority order in "DISPLAY PRIORITY" in the layout display condition information 74h is the user layout, the setting tool 75a determines whether to allow the display of the user layout on the basis of "LAYOUT ALLOWED TO BE DISPLAYED" in the layout display condition information 74h (S321).

If determining in S321 to allow the display of the user layout, the setting tool 75a determines whether the target user layout exists (S322).

If determining in S322 that the target user layout exists, the setting tool 75a specifies the target user layout (S319), and terminates the layout specifying processing illustrated in FIG. 26 to FIG. 28.

If determining in S321 not to allow the display of the user layout or determining in S322 that the target user layout does not exist, the setting tool 75a determines whether the second priority order in "DISPLAY PRIORITY" in the layout display condition information 74h is the group layout (S323).

If determining in S323 that the second priority order in "DISPLAY PRIORITY" in the layout display condition information 74h is the group layout, the setting tool 75a determines whether to allow the display of the group layout on the basis of "LAYOUT ALLOWED TO BE DISPLAYED" in the layout display condition information 74h (S324).

If determining in S324 to allow the display of the group layout, the setting tool 75a determines whether the target group exists (S325).

If determining in S325 that the target group exists, the setting tool 75a determines whether the target group layout exists (S326).

If determining in S326 that the target group layout exists, the setting tool 75a specifies the target group layout (S315), and terminates the layout specifying processing illustrated in FIG. 26 to FIG. 28.

If determining in S320 that the first priority order in "DISPLAY PRIORITY" in the layout display condition information 74h is not the user layout, if determining in S323 that the second priority order in "DISPLAY PRIORITY" in the layout display condition information 74h is not the group layout, if determining in S324 not to allow the display of the group layout, if determining in S325 that the target group does not exist, or determining in S326 that the target group layout does not exist, the setting tool 75a specifies the target device layout (S302), and terminates the layout specifying processing illustrated in FIG. 26 to FIG. 28.

For example, in the case where the user list 74g and the layout management information 74e are those illustrated in FIG. 8 and FIG. 9, respectively, where "DISPLAY METHOD" in the layout display condition information 74h is "USER SELECTION", and where "LAYOUT ALLOWED TO BE DISPLAYED" in the layout display condition information 74h is set to allow the display of both of the group layout and the user layout, at the time when "User a" requests to log in to "Device a", the setting tool 75a determines in S305 that the target group does not exist, and determines in S309 that the target user layout does not exist. Accordingly, the setting tool 75a only specifies the layout a as the device layout (S303).

In the case where the user list 74g and the layout management information 74e are those illustrated in FIG. 8 and FIG. 9, respectively, where "DISPLAY METHOD" in the layout display condition information 74h is "USER SELECTION", and where "LAYOUT ALLOWED TO BE DISPLAYED" in the layout display condition information 74h is set to allow the display of both of the group layout and the user layout, at the time when "User a" requests to log in to "Device b", the setting tool 75a specifies the layout b as the device layout, the layout d as the group layout, and the layout g as the user layout (S303, S307, and S310).

In the case where the user list 74g and the layout management information 74e are those illustrated in FIG. 8 and FIG. 9, respectively, where "DISPLAY METHOD" in the layout display condition information 74h is "PRIORITY ORDER", where "LAYOUT ALLOWED TO BE DISPLAYED" in the layout display condition information 74h is set to allow the display of both of the group layout and the user layout, and where "DISPLAY PRIORITY" in the layout display condition information 74h is "USER LAYOUT", "GROUP LAYOUT", and "DEVICE LAYOUT" in the order of priority, at the time when "User a" requests to log in to "Device a", the setting tool 75a determines in S322 that the target user layout does not exist, and determines in S325 that the target group does not exist. Accordingly, the setting tool 75a only specifies the layout a as the device layout (S302).

In the case where the user list 74g and the layout management information 74e are those illustrated in FIG. 8 and FIG. 9, respectively, where "DISPLAY METHOD" in the layout display condition information 74h is "PRIORITY ORDER", where "LAYOUT ALLOWED TO BE DISPLAYED" in the layout display condition information 74h is set to allow the display of both of the group layout and the user layout, and where "DISPLAY PRIORITY" in the layout display condition information 74h is "USER LAYOUT", "GROUP LAYOUT", and "DEVICE LAYOUT" in the order of priority, at the time when "User b" requests to log in to "Device b", the setting tool 75a determines in S322 that the target user layout exists. Accordingly, the setting tool 75a only specifies the layout g as the user layout (S319).

As illustrated in FIG. 25, after the processing in S189, the setting tool 75a of the setting system 70 transmits the layout specified in S189 to the image forming device 20 (S190).

In the case where the single layout is transmitted from the setting system 70 in S190, when receiving the layout transmitted from the setting system 70 in S190, the client application 28a of the image forming device 20 displays the operation screen corresponding to this layout on the display unit 22 (S191), and terminates the operation illustrated in FIG. 25.

On the other hand, in the case where the plural layouts are transmitted from the setting system 70 in S190, the client application 28a displays, on the display unit 22, a layout selection screen used for the user to select one layout of the plural layouts transmitted from the setting system 70 in S190 (S192).

Then, the client application 28a displays the operation screen corresponding to the layout, which has been selected on the layout selection screen, on the display unit 22 (S193), and terminates the operation illustrated in FIG. 25.

The operation of the information processing system 10 in the case where the image forming device 20 according to the present modified embodiment uses the document processing flow execution system 40 by using the ticket transmitted from the user information holding system 60 is the same as that of the information processing system 10 (FIG. 15) according to the embodiment of the above-described disclosure.

Next, a description will be made on operation of the information processing system 10 in the case where the user logs in to the image forming device 20 by using the PIN code.

Figure 29:
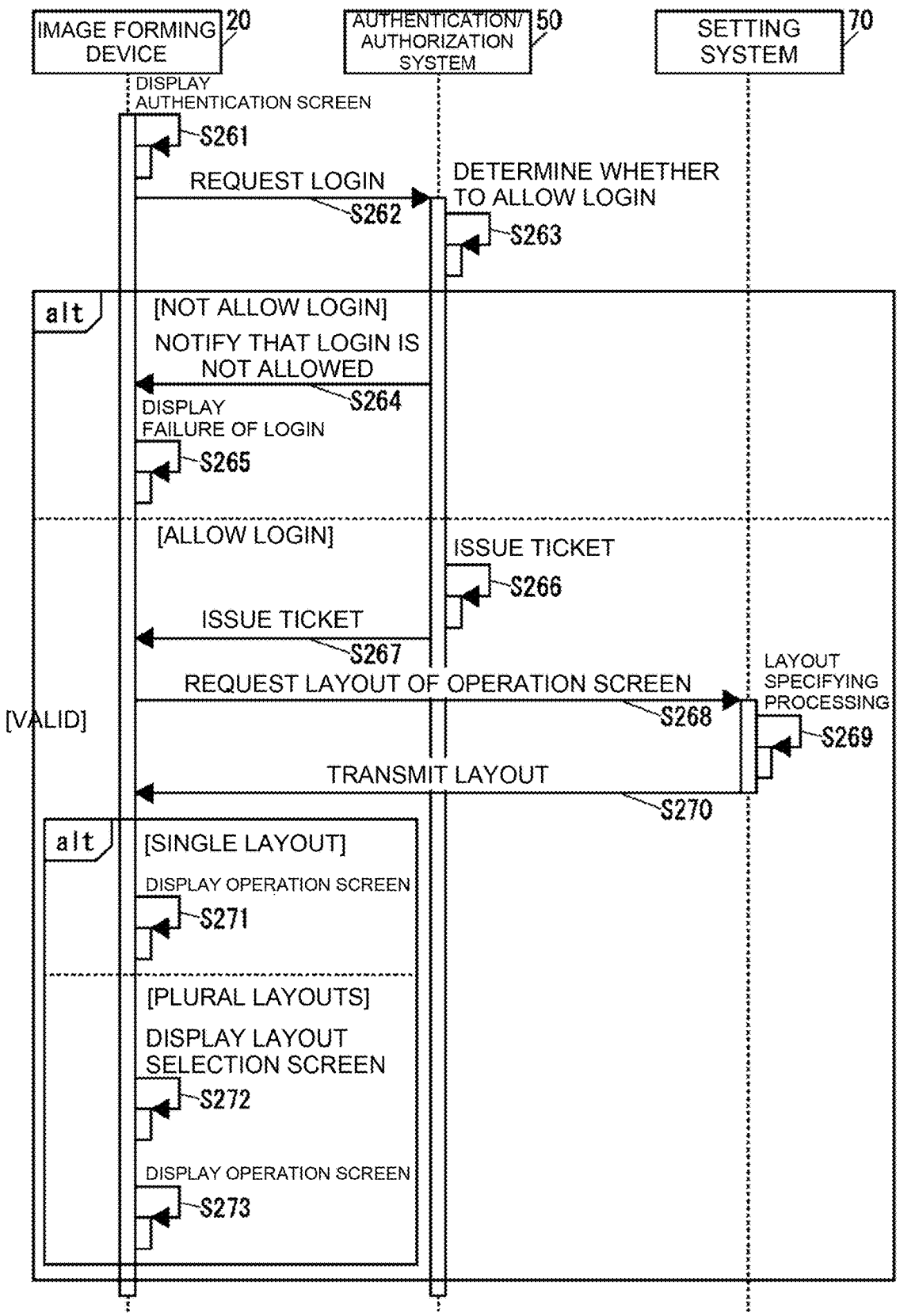
FIG. 29 is a sequence diagram of operation of the information processing system in the case where the user logs in to the image forming device by using the PIN code in the setting system according to the modified embodiment of the information processing system according to the embodiment of the present disclosure.

FIG. 29 is a sequence diagram of the operation of the information processing system 10 in the case where the user logs in to the image forming device 20 by using the PIN code.

The operation illustrated in FIG. 29 is operation of a case where the login method by using the PIN code is included in the login method information 27c in the image forming device 20 in the present modified embodiment. In this operation, in the case where the user is not currently logging in to the image forming device 20, the operation by the client application 28a of the image forming device 20 from operation for displaying the authentication screen for the user to log in to the image forming device 20 on the display unit 22 (S261) to operation for receiving the ticket transmitted from the authentication/authorization system 50 and requesting the setting system 70 for the layout of the operation screen (S268) are the same as those by the information processing system 10 (FIG. 15) according to the embodiment of the above-described disclosure.

When receiving the layout request in S268, the setting tool 75a of the setting system 70 executes the layout specifying processing for specifying the layout of the operation screen on the basis of the layout management information 74e (S269).

The layout specifying processing in S269 is the same as the layout specifying processing illustrated in FIG. 26 to FIG. 28.

After the processing in S269, the setting tool 75a of the setting system 70 transmits the layout specified in S269 to the image forming device 20 (S270).

In the case where the single layout is transmitted from the setting system 70 in S270, when receiving the layout transmitted from the setting system 70 in S270, the client application 28a of the image forming device 20 displays the operation screen corresponding to this layout on the display unit 22 (S271), and terminates the operation illustrated in FIG. 29.

On the other hand, in the case where the plural layouts are transmitted from the setting system 70 in S270, the client application 28a displays, on the display unit 22, the layout selection screen used for the user to select one layout of the plural layouts transmitted from the setting system 70 in S270 (S272).

Then, the client application 28a displays the operation screen corresponding to the layout, which has been selected on the layout selection screen, on the display unit 22 (S273), and terminates the operation illustrated in FIG. 29.

In FIG. 29, the description has been made on the case where the user logs in to the image forming device 20 by using the PIN code. However, the same applies to the case where the user logs in to the image forming device 20 by using the IC card ID. However, in the case where the user logs in to the image forming device 20 by using the IC card ID, the IC card ID read by the IC card reader, which is not illustrated and is connected to the image forming device 20, is used instead of the PIN code.

In the present modified embodiment, the operation of the information processing system 10 in the case where the image forming device 20 uses the document processing flow execution system 40 by using the ticket transmitted from the authentication/authorization system 50 is the same as that of the information processing system 10 (FIG. 17) according to the embodiment of the above-described disclosure.

As it has been described so far, in the case where the image forming device requests the layout (S188 or S268), the setting system 70 according to the present modified embodiment transmits the layout, which is associated with the user who has logged in to this image forming device 20, to the image forming device (S189 to S190 or S269 to S270). Accordingly, the administrator of the image forming device does not have to check the operation screen, which is displayed by the image forming device, on the image forming device for each of the image forming devices, but can check such an operation screen on the setting system 70. As a result, even in the case where the administrator manages the large number of the image forming devices 20, it is possible to reduce the possibility of the presence of the image forming device 20 that displays the inappropriate operation screen.

In the case where the image forming device 20 requests for the layout (S188 or S268) and where both of the user layout and the group layout are associated with the user who has logged in to this image forming device 20, the setting system 70 according to the present modified embodiment transmits, to the image forming device 20, the layout in the higher priority order of the user layout and the group layout associated with this user (S211 to S226 and "S190 or S270"). Therefore, it is possible to reduce the possibility of the presence of the image forming device 20 that displays the inappropriate operation screen.

In the case where the image forming device 20 requests for the layout (S188 or S268), the setting system 70 according to the present modified embodiment transmits, to the image forming device 20, the layout in the higher priority order of the layout, which is associated with the user who has logged in to this image forming device, and the device layout ("S302 and S311 to S326" and "S190 or S270"). Therefore, it is possible to reduce the possibility of the presence of the image forming device 20 that displays the inappropriate operation screen.

In the information processing system 10 according to the present modified embodiment, in the case where the image forming device 20 requests the setting system 70 for the layout (S188 or S268) and where both of the user layout and the group layout are associated with the user who has logged in to this image forming device 20, the setting system 70 transmits the user layout and the group layout associated with this user to the image forming device 20 (S304 to S310 and "S190 or S270"), the image forming device 20 causes the user to select one layout of the plural layouts transmitted from the setting system 70 to the image forming device 20 (S192 or S272), and the image forming device displays the operation screen corresponding to the layout selected by the user (S193 or S273). Therefore, it is possible to reduce the possibility of the presence of the image forming device that displays the inappropriate operation screen.

In the information processing system 10 according to the present modified embodiment, in the case where the image forming device 20 requests the setting system 70 for the layout (S188 or S268), the setting system 70 transmits, to the image forming device 20, the device layout associated with this image forming device 20 and the layout associated with the user who has logged in to this image forming device (S303 to S310 and "S190 or S270"), the image forming device 20 causes the user to select one layout of the plural layouts transmitted from the setting system 70 to the image forming device 20 (S192 or S272), and the image forming device 20 displays the operation screen corresponding to the layout selected by the user (S193 or S273). Therefore, it is possible to reduce the possibility of the presence of the image forming device 20 that displays the inappropriate operation screen.

Also, in the present modified embodiment, the electronic device is the image forming device. However, the electronic device may be other than the image forming device such as the PC.

What is claimed is:

1. A setting system for setting an operation screen in an electronic device, the setting system
    having layout management information that manages a layout of the operation screen of the electronic device in association with information on the electronic device, and
    according to a request for the layout by the electronic device, specifying the layout to be transmitted to the electronic device on the basis of the layout management information and transmitting the layout to the electronic device,
    wherein the layout management information includes association between device information on the electronic device and the layout of the operation screen, and the specified layout is the layout associated with the electronic device that has made the request,
    wherein the layout management information further includes association between information on a user of the electronic device and the layout of the operation screen, and the specified layout is the layout associated with the user who has logged in to the electronic device that has made the request, and
    wherein the association between the information on the user of the electronic device and the layout of the operation screen includes: association between personal information of the user and the layout of the operation screen; and association between information on a group to which the user belongs and the layout of the operation screen.

2. The setting system according to claim 1, wherein
    in the case where reservation is accepted for installing, in the electronic device at specific timing, a program which is used to request the setting system for the layout, the program is installed in the electronic device at the specific timing.

3. The setting system according to claim 2, wherein
    at the specific timing, the program as a reservation target is installed only in the electronic device in which the program is not installed and the electronic device in which an older version of the program than a version of the program as the reservation target is installed.

4. The setting system according to claim 1, wherein
    the setting system has layout display condition information that includes a priority order for displaying the layout associated with the electronic device, the layout associated with the individual user, and the layout associated with the group, and
    the setting system specifies the layout to be transmitted to the electronic device according to the priority order on the basis of the layout management information.

5. The setting system according to claim 1, wherein
according to the request for the layout by the electronic device, the setting system specifies a plurality of the layouts that are managed in association with the information on the electronic device on the basis of the layout management information, and sends the plural layouts to the electronic device.

6. An information processing system comprising:

an electronic device; and a setting system that sets an operation screen in the electronic device, wherein the setting system has layout management information that manages a layout of the operation screen of the electronic device in association with information on the electronic device, the electronic device requests the setting system for the layout, according to the request for the layout by the electronic device, the setting system specifies the layout to be transmitted to the electronic device on the basis of the layout management information and transmits the layout to the electronic device, and the electronic device displays the operation screen corresponding to the layout received from the setting system, and wherein the layout management information includes: association between device information on the electronic device and the layout of the operation screen; and association between information on the user of the electronic device and the layout of the operation screen, according to the request for the layout by the electronic device, the setting system transmits, to the electronic device, the layout associated with the electronic device that has made the request and the layout associated with the user who has logged in to the electronic device that has made the request, and the electronic device displays the operation screen corresponding to one layout that is selected by the user from a plurality of the layouts transmitted from the setting system.

7. The information processing system according to claim 6, wherein the association between the information on the user of the electronic device and the layout of the operation screen includes: association between personal information of the user and the layout of the operation screen; and association between information on a group to which the user belongs and the layout of the operation screen.

* * * * *